United States Patent [19]

Takada et al.

[11] Patent Number: 5,729,449
[45] Date of Patent: Mar. 17, 1998

[54] CURRENT COMMAND TYPE PWM INVERTER APPARATUS WITH LOGIC CIRCUIT FOR GENERATING SWITCHING COMMAND SIGNALS AT PERIODICAL TIMINGS

[75] Inventors: Kazuyuki Takada, Hirakata; Yoshinori Isomura, Itami; Toshiki Tsubouchi, Takefu, all of Japan

[73] Assignee: Matsushita Electric Industrial Co., Ltd., Osaka-fu, Japan

[21] Appl. No.: 680,756

[22] Filed: Jul. 15, 1996

[30] Foreign Application Priority Data

Jul. 19, 1995 [JP] Japan .................... 7-182484

[51] Int. Cl.[6] .................................. H02M 3/24
[52] U.S. Cl. .................... 363/98; 318/811; 388/811; 363/41
[58] Field of Search .................... 318/811; 388/811; 363/17, 41, 98, 132

[56] References Cited

U.S. PATENT DOCUMENTS 4,099,225  7/1978  Nygaard .................... 363/56
4,878,163  10/1989  Yamato et al. .................... 363/8
5,309,079  5/1994  Takada .................... 318/811

FOREIGN PATENT DOCUMENTS 63-178790  7/1988  Japan .

Primary Examiner—Peter S. Wong
Assistant Examiner—Shawn Riley
Attorney, Agent, or Firm—Wenderoth, Lind & Ponack

[57] ABSTRACT

In a current command type PWM inverter apparatus including first to sixth main circuit switching power devices for supplying line currents to a three-phase motor, at a periodical state updating first timing, and at least one second timing when any one of first, second and third comparison signals between respective detected line currents and respective line current command signals change after the state updating first timing, a logic circuit generates and outputs first to sixth switching command signals to the main circuit switching power devices so as to minimize errors between respective line current command signals and respective detected line currents.

20 Claims, 14 Drawing Sheets

Fig.3A
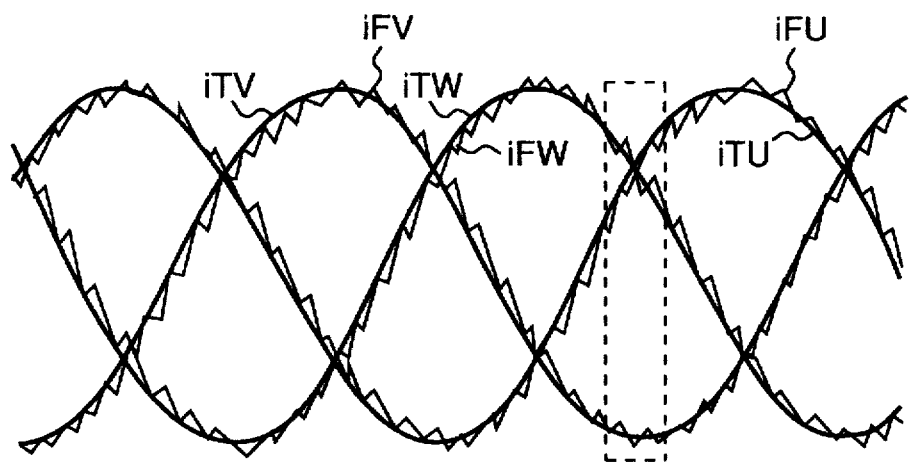
Fig.3B
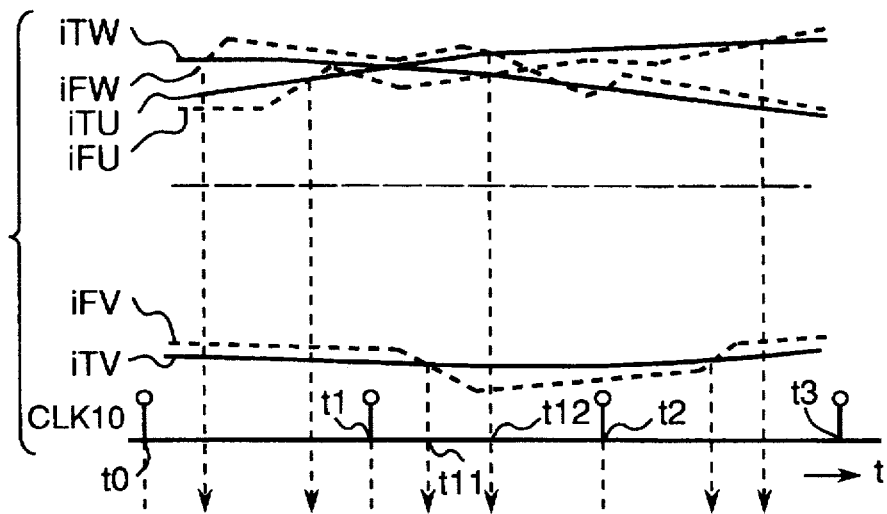
Fig.3C
| NO. | E00 | EY1 | EY2 | A00 | AX1 | AX2 | F00 | FY1 | FY2 |
|---|---|---|---|---|---|---|---|---|---|
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | L | H | H | H | L | L |
| PW | H | L | L | L | L | H | L | L | L |
| Q1 | ○ | ○ | X | ○ | ○ | ○ | ○ | ○ | X |
| Q2 | X | X | X | X | ○ | ○ | ○ | X | X |
| Q3 | ○ | X | X | X | X | ○ | X | X | X |
| Q4 | X | X | ○ | X | X | X | X | X | ○ |
| Q5 | ○ | ○ | ○ | ○ | X | X | X | ○ | ○ |
| Q6 | X | ○ | ○ | ○ | ○ | X | ○ | ○ | ○ |
Notes.  ○:ON  X:OFF
Leading edge timing is indicated by a pulse signal.

Fig. 10A
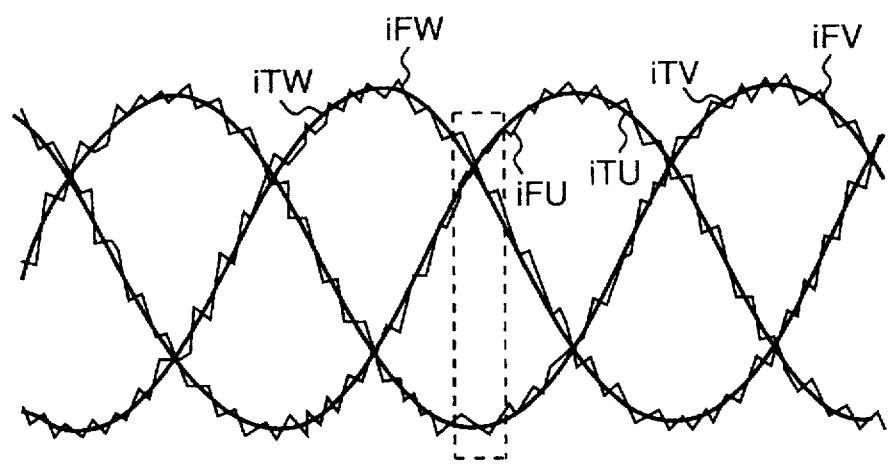
Fig. 10B
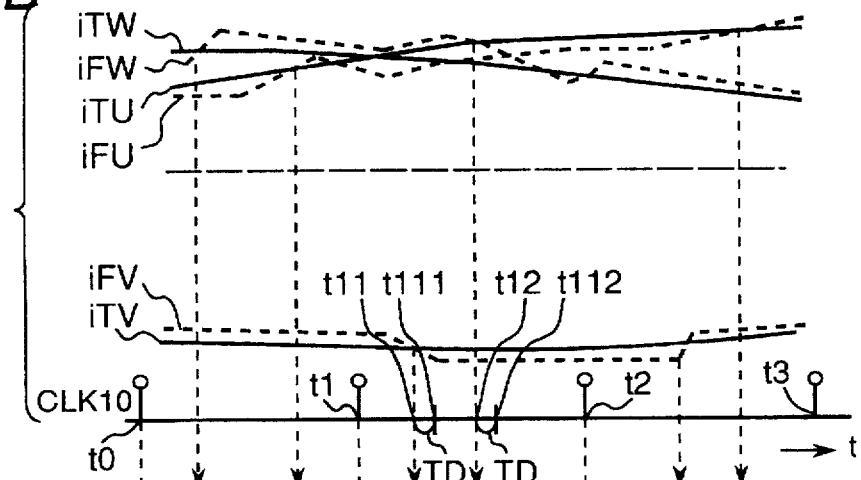
Fig. 10C
| NO. | E00 | EY1 | EY2 | A00 | AX1 | AX2 | F00 | FY1 | FY2 |
|---|---|---|---|---|---|---|---|---|---|
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | L | H | H | H | L | L |
| PW | H | L | L | L | L | H | L | L | L |
| PU1 | H | H | L | H | H | H | H | H | L |
| PV1 | L | L | L | L | H | H | H | L | L |
| PW1 | H | L | L | L | L | H | L | L | L |
| Q1 | ○ | ○ | × | ○ | ○ | ○ | ○ | ○ | × |
| Q2 | × | × | × | × | ○ | ○ | ○ | × | × |
| Q3 | ○ | × | × | × | × | ○ | × | × | × |
| Q4 | × | × | ○ | × | × | × | × | × | ○ |
| Q5 | ○ | ○ | ○ | ○ | × | × | × | ○ | ○ |
| Q6 | × | ○ | ○ | ○ | ○ | × | ○ | ○ | ○ |
Notes. ○:ON   ×:OFF

CURRENT COMMAND TYPE PWM INVERTER APPARATUS WITH LOGIC CIRCUIT FOR GENERATING SWITCHING COMMAND SIGNALS AT PERIODICAL TIMINGS

BACKGROUND OF THE INVENTION

1. Field of the Invention

The present invention relates to a current command type PWM (Pulse Width Modulation) inverter apparatus for driving and controlling a three-phase motor, and in particular, to a current command type PWM (Pulse Width Modulation) inverter apparatus comprising a logic circuit for generating switching command signals at periodical timings.

2. Description of the Prior Art

In recent years, current command type PWM inverters are extensively used in driving and controlling three-phase motors such as induction motors, synchronous motors, reluctance motors, or the like.

In comparison with a voltage command type PWM inverter which commands a voltage to be applied to a motor and applies the voltage conforming to the command, to the motor, the current command type PWM inverter, which commands a current to be sent into a motor and consequently sends the current conforming to the command through the motor, is advantageous in responsibility and controllability. In particular, for controlling an AC servomotor and the like, the current command type PWM inverter is adopted in almost all the cases.

A construction of a generic current command type PWM inverter system will be described here with reference to FIG. 11.

Referring to FIG. 11, first of all, a fundamental frequency f and an effective current value ip of a three-phase AC (Alternating Current) current waveform to be supplied to a three-phase motor 1 are set in a current command generator 7, and based on this information, the current command generator 7 internally generates current command signals to be sent into the three-phase motor 1, as a first line current command signal iTU, a second line current command signal iTV and a third line current command signal iTW.

Then, a motor current detector circuit 9 detects two line currents of the three-phase motor 1, obtains the remaining one line current by obtaining the sum of the detected two line currents and inverting the sign of the sum value, and outputs the resulting detected currents as a first detected line current iFU, a second detected line current iFV and a third detected line current iFW. It is to be noted that the motor current detector circuit 9 may detect the three line currents of the three-phase motor 1, and then output the first detected line current iFU, the second detected line current iFV and the third detected line current iFW.

Then, a current controller 106 receives the first line current command signal iTU, the second line current command signal iTV, the third line current command signal iTW, the first detected line current iFU, the second detected line current iFV and the third detected line current iFW, and generates a first switching command signal PU, a second switching command signal PV and a third switching command signal PW so that the first line current command signal iTU, the second line current command signal iTV and the third line current command signal iTW are made to respectively coincide with the first detected line current iFU, the second detected line current iFV and the third detected line current iFW as much as possible.

Further, a main circuit power controller 8 comprises:
(a) a logic inverter circuit 5 comprising three inverters;
(b) a base driving circuit 4 comprising six base drivers;
(c) a main circuit DC (Direct Current) power source 3; and
(d) a main circuit power device circuit 2 having a three-phase bridge connection, wherein the main circuit power device circuit 2 comprises:
 (d-1) a first main circuit switching power device Q1 which is connected to a positive electrode of the main circuit DC power source 3 and supplies a first line current IU to the three-phase motor 1;
 (d-2) a second main circuit switching power device Q2 which is connected to the positive electrode of the main circuit DC power source 3 and supplies a second line current IV to the three-phase motor 1;
 (d-3) a third main circuit switching power device Q3 which is connected to the positive electrode of the main circuit DC power source 3 and supplies a third line current IW to the three-phase motor 1;
 (d-4) a fourth main circuit switching power device Q4 which is connected to a negative electrode of the main circuit DC power source 3 and supplies the first line current IU to the three-phase motor 1;
 (d-5) a fifth main circuit switching power device Q5 which is connected to the negative electrode of the main circuit DC power source 3 and supplies the second line current IV to the three-phase motor 1;
 (d-6) a sixth main circuit switching power device Q6 which is connected to the negative electrode of the main circuit DC power source 3 and supplies the third line current IW to the three-phase motor 1; and
 (d-7) six reflux diodes each connected in parallel between the collector and the emitter of each of the main circuit switching power devices Q1, Q2, Q3, Q4, Q5 and Q6.

The main circuit power device circuit 2 operates to turn on either the first main circuit switching power device Q1 or the fourth main circuit switching power device Q4 in accordance with the first switching command signal PU, turn on either the second main circuit switching power device Q2 or the fifth main circuit switching power device Q5 in accordance with the second switching command signal PV, and turn on either the third main circuit switching power device Q3 or the sixth main circuit switching power device Q6 in accordance with the third switching command signal PW.

In this case, when the first switching command signal PU becomes a High level (referred to as an H-level hereinafter), the first main circuit switching power device Q1 is turned on. On the other hand, when the first switching command signal PU becomes a Low level (referred to as an L-level hereinafter), the fourth main circuit switching power device Q4 is turned on. When the second switching command signal PV becomes the H-level, the second main circuit switching power device Q2 is turned on. On the other hand, when the second switching command signal PV becomes the L-level, the fifth main circuit switching power device Q5 is turned on. When the third switching command signal PW becomes the H-level, the third main circuit switching power device Q3 is turned on. On the other hand, when the third switching command signal PW becomes the L-level, the sixth main circuit switching power device Q6 is turned on.

The above describes the structure and operation of the generic current command type PWM inverter system.

A structure of a prior art current command type PWM inverter will be described with reference to FIG. 12.

FIG. 12 shows a structure of the prior art current controller 106 of the current command type PWM inverter system shown in FIG. 11.

FIGS. 13A through 13E show an operation of the inverter system shown in FIG. 12.

First of all, the first, second and third line current command signals iTU, iTV and iTW and the first, second and third detected line currents iFU, iFV and iFW are subjected to a subtraction process respectively in subtracters 117, 118 and 119 to obtain the first, second and third line current error signals iEU, iEV and iEW. Then first, second and third current error amplifiers 120, 121 and 122 receive the respective first, second and third line current error signals iEU, iEV and iEW, respectively, and then, output amplified voltage command signals VU, VV and VW, respectively. Each of the current error amplifiers 120, 121 and 122 is generally implemented by a proportion and integration type amplifier as shown in FIG. 14, and a gain characteristic thereof can be represented by the Equation (2):

$$G(s)=R2\times(R3\times C1\times s)/[R1\times\{(R2+R3)\times C1\times s+13\}] \quad (1),$$

where $s=j\omega$ is a variable of Laplacian conversion.

The reference numeral 139 denotes a three-phase PWM signal generator comprised of first, second and third comparators 123, 124 and 125 and a triangular wave generator 126. The first, second and third comparators 123, 124 and 125 compare a triangular wave signal SC outputted from the triangular wave generator 126 with the respective voltage command signals VU, VV and VW, respectively, and then, output the first, second and third switching command signals PU, PV and PW, respectively.

In the present case, each of the first, second and third comparators 123, 124 and 125 outputs the H-level when each of the voltage command signals VU, VV and VW is greater than the triangular wave signal SC, while each of the first, second and third comparators 123, 124 and 125 outputs the L-level when each of the voltage command signals VU, VV and VW is smaller than the triangular wave signal SC.

FIGS. 13A through 13E show an operation of the current controller 106 shown in FIG. 12, when the first, second and third line current command signals iTU, iTV and iTW are three-phase sine waves, respectively.

Considering the gains of the current error amplifiers 120, 121 and 122 shown in FIGS. 12 and 13A through 13E, it can be understood that each line current error can be reduced by increasing the gains of the current error amplifiers 120, 121 and 122 as a consequence of approach of the detected line currents to the respective line current command signals, and the responsibility of the detected line currents to the respective line current command signals is improved.

However, according to the structure of the above-mentioned prior art, owing to a phase delay due to an electric time constant of the three-phase motor 1, phase delays of the current error amplifiers 120, 121 and 122, a waste time delay of the three-phase PWM signal generator and the like, an oscillation phenomenon will occur when the current error amplifier gain is made too great. Therefore, the gain of each of the current error amplifiers 120, 121 and 122 is generally set to a value which is as great as possible and falls within a range in which no oscillation occurs. The gain of each of the current error amplifiers 120, 121 and 122 is determined in the designing stage by examining a loop transfer function of the current control loop from the characteristics of the three-phase motor 1, the motor current detector circuit 9, the current controller 106, and the main circuit power controller 8. In the present case, considering the manufacturing dependent variation of the characteristics and temperature characteristics, it is required to reduce the gain to a level at which no oscillation phenomenon occurs at worst. The work for determining the gain requires much labor of the operators engaging in the designing, and even a current command type PWM inverter having the same structure requires gain adjustment depending on different motors to which the inverter is to be connected, incurring such a problem that much labor is required for the control of the manufacturing process.

Furthermore, when the specifications of the three-phase motor 1 to be connected to the current command type PWM inverter have not been determined in the designing stage (e.g., in the case of a general use inverter, a general use AC servo driver or the like), it is required to adjust the gain in accordance with the specifications of the three-phase motor 1 upon determining and installing the three-phase motor to which the inverter is to be connected, and there is such a problem that this gain adjustment work is a bottleneck.

Furthermore, the offset and drift of the triangular wave generator and the current error amplifiers 120, 121 and 122 themselves deteriorate the current control error and narrow the dynamic ranges of the amplified error signals. Therefore, an operational amplifier having a small offset and drift is required as a component of them, and depending on the cases, an offset adjusting work is required in the manufacturing stage, incurring the problem of cost increase.

FIG. 12 shows a prior art example of the current controller 106 implemented by an analog circuit, however, there exists a current controller implementing a similar structure by a digital circuit such as a microcomputer which subjects the first, second and third detected line currents iFU, iFV and iFW to an analog to digital conversion process by means of an A/D converter. In such a case, the gain of the current error amplifier is required to be determined by examining the loop transfer function of the current control loop from the characteristics of the three-phase motor 1, the motor current detector circuit 9, the current controller 106, and the main circuit power controller 8, and their problems are the same as those of the current controller implemented by the analog circuit.

Furthermore, when the current error amplifier is implemented by a digital circuit such as a microcomputer or the like, the offset and drift of the current error amplifier itself can be eliminated because they are achieved by digital calculation. However, as the calculation processing time increases, the phase delay increases and the circuit tends to oscillate. This consequently means that the gain cannot be increased unless the processing time is reduced, and therefore, a microcomputer having a very high speed calculation processing capability or the like must be used, incurring the problem of cost increase.

Furthermore, the phase delay of the A/D converter for converting the first, second and third detected line currents iFU, iFV and iFW into digital data becomes greater as the time for conversion increases and tends to oscillate. This consequently means that the gain cannot be increased unless the conversion time is reduced, and therefore, an A/D converter having a very high speed conversion capability must be used, incurring the problem of cost increase. Furthermore, the offset and drift of the A/D converter consequently deteriorate the current control error and narrow its dynamic range. Therefore, it is required to select an A/D converter having smaller offset and drift, incurring the problem of cost increase.

Furthermore, the three-phase PWM command signal generator implemented by a digital circuit has such problems that the three-phase PWM command signal generator has a complicated structure and high cost as shown in the digital three-phase PWM wave generating apparatus disclosed in the Japanese Patent Laid-Open Publication No. 4-312360.

SUMMARY OF THE INVENTION

An essential object of the present invention is therefore to provide a current command type PWM inverter apparatus which costs less and requires no gain adjustment.

Another object of the present invention is to provide a current command type PWM inverter apparatus capable of exhibiting a more excellent responsibility of driving line currents for line current command signals, as compared with the prior art apparatus.

In order to achieve the above-mentioned objective, according to one aspect of the present invention, there is provided a current command type PWM inverter apparatus comprising:

inverter apparatus including: a motor current detector for detecting line currents flowing from respective lines of the PWM inverter apparatus into a three-phase motor and outputting a first detected line current, a second detected line current and a third detected line current; and a current command generator for generating and outputting a first line current command signal, a second line current command signal and a third line current command signal for commanding the line currents to be sent from the respective lines into the three-phase motor.

Furthermore, the inverter apparatus includes: a first comparator for comparing the first line current command signal with the first detected line current, outputting a first line current comparison signal having a first level when the first detected line current is equal to or greater than the first line current command signal, and outputting the first line current comparison signal having a second level when the first detected line current is smaller than the first line current command signal; a second comparator for comparing the second line current command signal with the second detected line current, outputting a second line current comparison signal having a first level when the second detected line current is equal to or greater than the second line current command signal, and outputting the second line current comparison signal having a second level when the second detected line current is smaller than the second line current command signal; and a third comparator for comparing the third line current command signal with the third detected line current, outputting a third line current comparison signal having a first level when the third detected line current is equal to or greater than the third line current command signal, and outputting the third line current comparison signal having a second level when the third detected line current is smaller than the third line current command signal.

Additionally, the inverter apparatus has: a main circuit DC power source; a main circuit power device circuit having a three-phase bridge connection and comprising first, second, third, fourth, fifth and sixth main circuit switching power devices, and six reflux diodes respectively connected in parallel with said first, second, third, fourth, fifth and sixth main circuit switching power devices; a logic circuit for receiving the first line current comparison signal, the second line current comparison signal and the third line current comparison signal, and generating and outputting first, second, third, fourth, fifth and sixth switching command signals for turning on or off the first, second, third, fourth, fifth and sixth main circuit switching power devices, respectively; and a timing generator for generating and outputting a periodical state updating first timing to the logic circuit.

The first main circuit switching power device is connected to a positive electrode of the main circuit DC power source and supplies a first line current to the three-phase motor from the main circuit DC power source based on the first switching command signal.

The second main circuit switching power device is connected to the positive electrode of the main circuit DC power source and supplies a second line current to the three-phase motor from the main circuit DC power source based on the second switching command signal.

The third main circuit switching power device is connected to the positive electrode of the main circuit DC power source and supplies a third line current to the three-phase motor from the main circuit DC power source based on the third switching command signal.

The fourth main circuit switching power device is connected to a negative electrode of the main circuit DC power source and supplies the first line current to the three-phase motor from the main circuit DC power source based on the fourth switching command signal.

The fifth main circuit switching power device is connected to the negative electrode of the main circuit DC power source and supplies the second line current to the three-phase motor from the main circuit DC power source based on the fifth switching command signal.

The sixth main circuit switching power device is connected to the negative electrode of the main circuit DC power source and supplies the third line current to the three-phase motor from the main circuit DC power source based on the sixth switching command signal.

Thus, at the state updating first timing, and at least one second timing when any one of the first, second or third comparison signals change after the state updating first timing, said logic circuit generates and outputs the first, second, third, fourth, fifth and sixth switching command signals.

In the above-mentioned current command type PWM inverter apparatus, said logic circuit preferably generates and outputs the first, second, third, fourth, fifth and sixth switching command signals so as to minimize an error between the first line current command signal and the first detected line current, an error between the second line current command signal and the second detected line current, and an error between the third line current command signal and the third detected line current.

According to another aspect of the present invention, each of the comparison signals may be outputted at the first level when the detected line current is greater than the value of the line current command signal, while each of the comparison signals may be outputted at the second level when the detected line current is equal to or smaller than the value of the line current command signal.

With the above-mentioned arrangement, according to the current command type PWM inverter apparatus of the present invention, the simple operation of deciding whether each of the first, second, third, fourth, fifth and sixth main circuit switching power devices is turned on or off in a direction in which the difference between the line current command signal and the detected line current is reduced in accordance with a state updating timing and a timing at which the first, second and third line current comparison signals or comparison result signals change is repeated, so that the line currents of the three-phase motor approach the respective line current command signals, proving the fact that each line current error can be reduced.

The current command type PWM inverter apparatus of the present invention has no current error amplifier, and therefore, the problems concerning the gain adjustment of the current error amplifier can be substantially solved, consequently requiring no gain adjustment.

Furthermore, even when the characteristics and the specifications of the three-phase motor, the motor current detector circuit, the current controller, and the main circuit power controller change, the inverter apparatus operates so as to consistently minimize each line current error.

Furthermore, the inverter apparatus operates to consistently minimize each line current error even when a manufacturing-dependent variation of characteristics, temperature characteristics and the like exist, and therefore, it has a more excellent current control responsibility as compared with the prior art apparatus, and causes no oscillation phenomenon.

Furthermore, the current controller of the current command type PWM inverter apparatus of the present invention can be implemented by a simple digital circuit except for the first, second and third comparing means. Therefore, the part implemented by the digital circuit causes neither offset nor drift and costs less.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 3A, 3B and 3C are timing charts showing an operation of the first preferred embodiment, wherein FIG. 3A shows first, second and third line current command signals iTU, iTV and iTW and first, second and third detected fine currents iFU, iFV and iFW, FIG. 3B shows respective signals in an operation of the logic circuit 10 when enlarging a dotted line portion of FIG. 3A, and FIG. 3C shows ON/OFF of main circuit switching power devices based on switching command signals PU, PV and PW;

FIGS. 10A, 10B and 10C are timing charts showing operations of a current controller and a switching command signal delay circuit of the fourth preferred embodiment according to the present invention, wherein FIG. 10A shows first, second and third line current command signals iTU, iTV and iTW and first, second and third detected line currents iFU, iFV and iFW, FIG. 10B shows respective signals in an operation of the logic circuit 10 when enlarging a dotted line portion of FIG. 10A, and FIG. 10C shows ON/OFF of main circuit switching power devices based on switching command signals PU, PV and PW;

FIGS. 13A, 13B, 13C, 13D and 13E are timing charts showing an operation of the prior art current controller shown in FIG. 12, wherein FIG. 13A shows first, second and third line current command signals iTU, iTV and iTW, and first, second and third detected line currents iFU, iFV and iFW, FIG. 3B shows voltage command signals VU, VV and VW, and a triangular wave signal S, FIG. 13C shows a first switching command signal PU, FIG. 13D shows a second switching command signal PV, and FIG. 13E shows a third switching command signal PW.

DETAILED DESCRIPTION OF THE PREFERRED EMBODIMENTS

Preferred embodiments according to the present invention will be described below with reference to the attached drawings.

First Preferred Embodiment

A first preferred embodiment according to the present invention will be described below with reference to the accompanying drawings.

Figure 7:
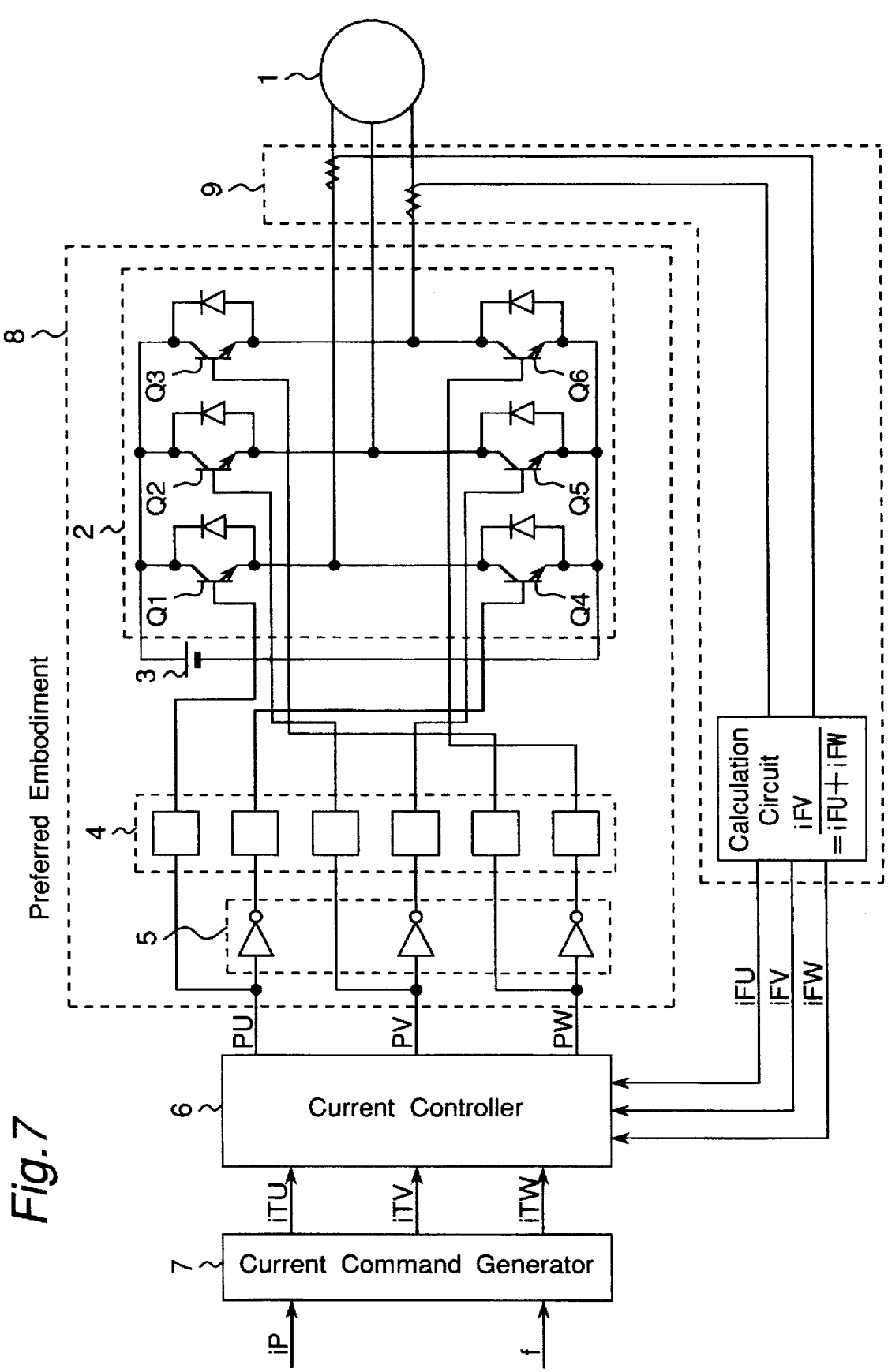
FIG. 7 is a block diagram of a current command type PWM inverter system of the preferred embodiments according to the present invention.

FIG. 7 shows a structure of a current command type PWM inverter system of the first preferred embodiment according to the present invention.

Referring to FIG. 7, first of all, a fundamental frequency f and an effective current value ip of a three-phase AC current waveform to be supplied to a three-phase motor are set in a current command generator 7, and based on the information, the current command generator 7 internally generates current command signals to be sent into the three-phase motor 1, and then outputs a first line current command signal iTU, a second line current command signal iTV and a third line current command signal iTW.

Then, a motor current detector circuit 9 detects two line currents of the three-phase motor 1, obtains the remaining one line current by obtaining the sum of the detected two line currents and inverting the sign of the sum value, and outputs the resulting three line currents as a first detected line current iFU, a second detected line current iFV and a third detected line current iFW. It is to be noted that the motor current detector circuit 9 may detect the three line currents of the three-phase motor 1 and then output the first detected line current iFU, the second detected line current iFV and the third detected line current iFW.

Then, a current controller 6 receives the first line current command signal iTU, the second line current command signal iTV, the third line current command signal iTW, the first detected line current iFU, the second detected line current iFV and the third detected line current iFW, and then, generates a first switching command signal PU, a second switching command signal PV and a third switching command signal PW.

An operation of the current controller 6 will be described in detail later.

Further, a main circuit power controller 8 comprises a logic inverter circuit 5 comprising three inverters, a base driving circuit 4 comprising six base drivers, a main circuit DC power source 3, and a main circuit power device circuit 2 having a three-phase bridge connection. The main circuit power device circuit 2 comprises:

(a) a first main circuit switching power device Q1 which is connected to a positive electrode of the main circuit DC power source 3 and supplies a first line current IU to the three-phase motor 1;

(b) a second main circuit switching power device Q2 which is connected to the positive electrode of the main circuit DC power source 3 and supplies a second line current IV to the three-phase motor 1;

(c) a third main circuit switching power device Q3 which is connected to the positive electrode of the main circuit DC power source 3 and supplies a third line current IW to the three-phase motor 1;

(d) a fourth main circuit switching power device Q4 which ms connected to a negative electrode of the main circuit DC power source 3 and supplies the first line current IU to the three-phase motor 1;

(e) a fifth main circuit switching power device Q5 which is connected to the negative electrode of the main circuit DC power source 3 and supplies the second line current IV to the three-phase motor 1;

(f) a sixth main circuit switching power device Q6 which is connected to the negative electrode of the main circuit DC power source 3 and supplies the third line current IW to the three-phase motor 1; and (g) six reflux diodes each connected in parallel between the collector and the emitter of each of the main circuit switching power devices Q1, Q2, Q3, Q4, Q5 and Q6.

The circuit comprised of the logic inverter circuit 5 and the base driving circuit 4 operates to turn on either the first main circuit switching power device Q1 or the fourth main circuit switching power device Q4 in accordance with the first switching command signal PU, to turn on either the second main circuit switching power device Q2 or the fifth main circuit switching power device Q5 in accordance with the second switching command signal PV, and to turn on either the third main circuit switching power device Q3 or the sixth main circuit switching power device Q6 in accordance with the third switching command signal PW.

In the preferred embodiment, when the first switching command signal PU becomes the H-level, the first main circuit switching power device Q1 is turned on. On the other hand, when the first switching command signal PU becomes the L-level, the fourth main circuit switching power device Q4 is turned on. When the second switching command signal PV becomes the H-level, the second main circuit switching power device Q2 is turned on. On the other hand, when the second switching command signal PV becomes the L-level, the fifth main circuit switching power device Q5 is turned on. When the third switching command signal PW becomes the H-level, the third main circuit switching power device Q3 is turned on. On the other hand, when the third switching command signal PW becomes the L-level, the sixth main circuit switching power device Q6 is turned on.

The above describes the structure of the current command type PWM inverter system of the first preferred embodiment according to the present invention.

Figure 1:
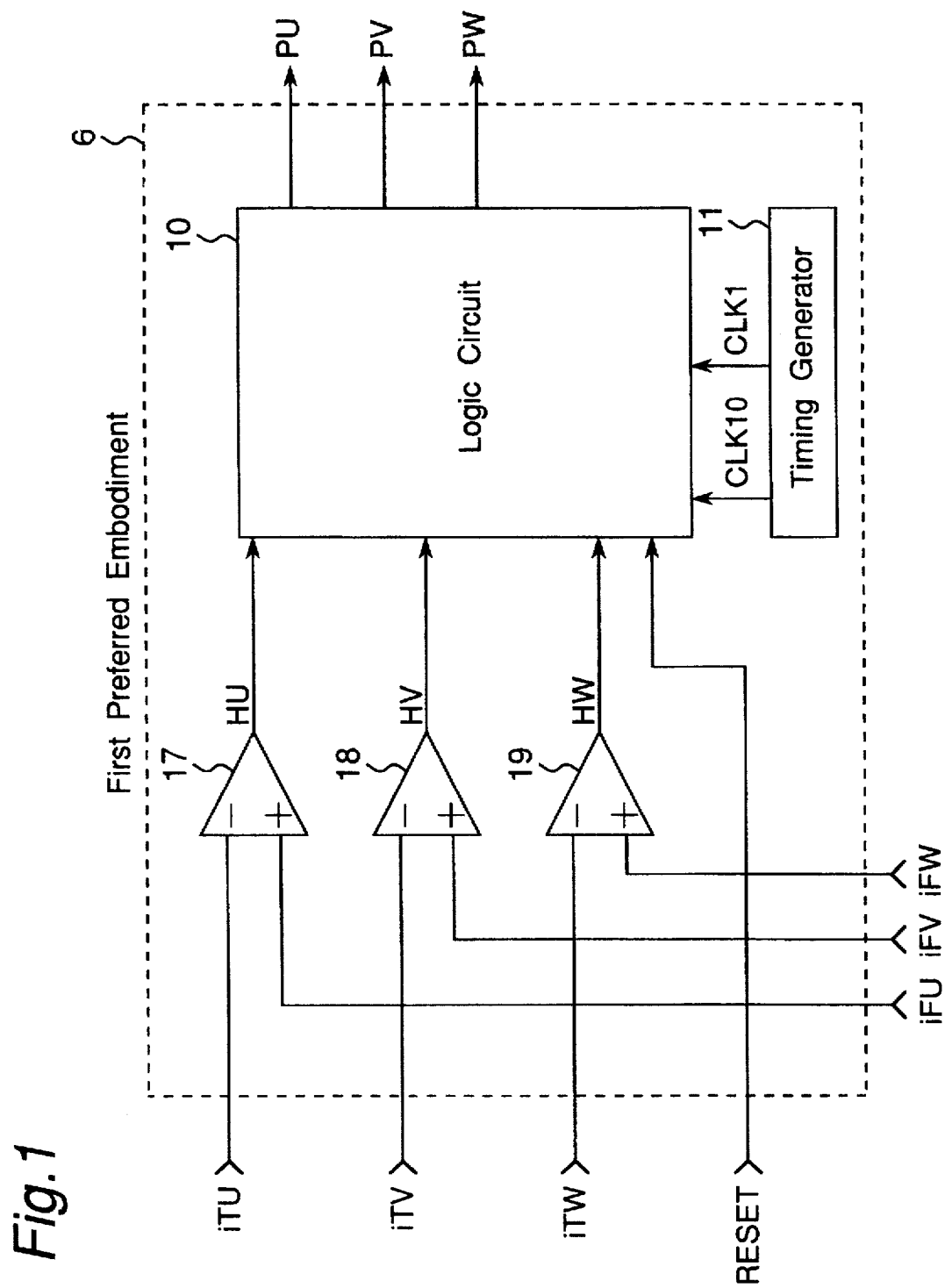
FIG. 1 is a block diagram of a current controller of a first preferred embodiment according to the present invention.

The current controller 6 of the current command type PWM inverter system of the first preferred embodiment according to the present invention shown in FIG. 7 has a construction as shown in FIG. 1.

Referring to FIG. 1, first, second and third comparators 17, 18 and 19 receive the command signals iTU, iTV and iTW at their respective inverted input terminals, respectively, and receive the first, second and third detected line currents iFU, iFV and iFW at their respective non-inverted input terminals, respectively. Then, the comparators 17, 18 and 19 output first, second and third line current comparison signals or comparison result signals HU, HV and HW, respectively.

For the sake of convenience of the following explanation, in the preferred embodiments, each of the comparison signals HU, HV and HW becomes the H-level when the detected line current is equal to or greater than the value of the line current command signal, while each of the comparison signals HU, HV and HW becomes the L-level when the detected line current is smaller than the value of the line current command signal. However, the present invention is not limited to this. In an alternate example, each of the comparison signals HU, HV and HW may become the H-level when the detected line current is greater than the value of the line current command signal, while each of the comparison signals HU, HV and HW may become the L-level when the detected line current is equal to or smaller than the value of the line current command signal.

Then, a logic circuit 10 receives the first, second and third line current comparison signals HU, HV and HW as well as a periodical state updating timing signal CLK10 periodically generated by a timing generator 11, and then, outputs first, second and third switching command signals PU, PV and PW for commanding the turning-on and turning-off of the main circuit switching power devices Q1, Q2, Q3, Q4, Q5 and Q6.

First of all, the logic circuit 10 effects state switching based on the signal levels of the first, second and third line current comparison signals HU, HV and HW in accordance with the timing of the leading edge of the state updating timing signal CLK10, outputs the first, second and third switching command signals PU, PV and PW, and then updates the first, second and third switching command signals PU, PV and PW based on the switching of the signal levels of the first, second and third line current comparison signals HU, HV and HW.

The truth table of the logic circuit 10 is shown here in Table 1.

TABLE 1

| State No. | Reset Signal RESET | State Updating Timing Signal CLK10 | Line Current Comparison signal | | | Switching Command Signal | | |
|---|---|---|---|---|---|---|---|---|
| | | | HU | HV | HW | PU | PV | PW |
| A00 | L | ↑ | L | H | H | H | L | L |
| AX1 | L | + | * | L | H | H | H | L |
| AX2 | L | + | * | L | L | H | H | H |
| A00 | L | ↑ | L | H | H | H | L | L |
| AY1 | L | + | * | H | L | H | L | H |
| AY2 | L | + | * | L | L | H | H | H |
| B00 | L | ↑ | H | L | H | L | H | L |
| BX1 | L | + | L | * | H | H | H | L |

TABLE 1-continued

| State No. | Reset Signal RESET | State Updating Timing Signal CLK10 | Line Current Comparison signal | | | Switching Command Signal | | |
|---|---|---|---|---|---|---|---|---|
| | | | HU | HV | HW | PU | PV | PW |
| BX2 | L | ♦ | L | * | L | H | H | H |
| B00 | L | ↑ | H | L | H | L | H | L |
| BY1 | L | ♦ | H | * | L | L | H | H |
| BY2 | L | ♦ | L | * | L | H | H | H |
| C00 | L | ↑ | H | H | L | L | L | H |
| CX1 | L | ♦ | L | H | * | H | L | H |
| CX2 | L | ♦ | L | L | * | H | H | H |
| C00 | L | ↑ | H | H | L | L | L | H |
| CY1 | L | ♦ | H | L | * | L | H | H |
| CY2 | L | ♦ | L | L | * | H | H | H |
| D00 | L | ↑ | H | L | L | L | H | H |
| DX1 | L | ♦ | * | H | L | L | L | H |
| DX2 | L | ♦ | * | H | H | L | L | L |
| D00 | L | ↑ | H | L | L | L | H | H |
| DY1 | L | ♦ | * | L | H | L | H | L |
| DY2 | L | ♦ | * | H | H | L | L | L |
| E00 | L | ↑ | L | H | L | H | L | H |
| EX1 | L | ♦ | H | * | L | L | L | H |
| EX2 | L | ♦ | H | * | H | L | L | L |
| E00 | L | ↑ | L | H | L | H | L | H |
| EY1 | L | ♦ | L | * | H | H | L | L |
| EY2 | L | ♦ | H | * | H | L | L | L |
| F00 | L | ↑ | L | L | H | H | H | L |
| FX1 | L | ♦ | H | L | * | L | H | L |
| FX2 | L | ♦ | H | H | * | L | L | L |
| F00 | L | ↑ | L | L | H | H | H | L |
| FY1 | L | ♦ | L | H | * | H | L | L |
| FY2 | L | ♦ | H | H | * | L | L | L |
| G00 | L | ♦ | H | H | H | L | L | L |
| H00 | L | ♦ | L | L | L | H | H | H |
| CLR | H | ♦ | * | * | * | L | L | L |

Table 1 is read as follows.

In Table 1, the state No. (A00, AX1, AX2, A00, AY1, AY2, B00, BX1, etc.) represents the input and output state of the logic circuit 10, the symbol ↑ of the state updating timing signal represents the leading edge of the state updating timing signal CLK10, and the symbol ♦ represents the stable state of the H-level or the L-level.

Furthermore, the symbol * of the line current comparison signal represents "DON'T CARE", i.e., the operation does not depend on whether the state is at the H-level or the L-level. Regarding the others, H represents the H-level, and L represents the L-level.

A reset signal RESET is an input signal for initializing the logic circuit 10, and the reset signal RESET normally has the L-level. The logic circuit 10 is immediately initialized when the reset signal becomes the H-level.

An operation of the logic circuit 10 will be described below according to Table 1. First of all, when the state updating timing signal CLK10 rises (when its leading edge is inputted), the system state shifts to any one of eight state Nos. A00, B00, C00, D00, E00, F00, G00 and H00 in accordance with the levels of the first, second and third line current comparison signals HU, HV and HW at the timing. In this case, paying attention to the first character of the state numbers, a state is branched into eight states of A through H. For the sake of convenience of explanation, it is assumed that the three-figure alphabetical and numerical symbols of each state No. are referred to as the first figure, the second figure and the third figure, sequentially from the left hand end figure thereof.

First of all, explanation will be made to a case where the system state shifts to any one of the state Nos. A00, B00, C00, D00, E00 and F00.

When the system state shifts to any one of these states, attention is paid to two signals having an identical signal level among the first, second and third line current comparison signals HU, HV and HW at the timing of the leading edge of the state updating timing signal CLK10. Depending on which of the two signals switches first, the subsequent operation will be different. Paying attention to the second figure of each state No., a state is branched into two of X and Y.

For example, in the case of the state No. A00, the system state shifts to the state No. AX1 when the second line current comparison signal HV changes first or shifts to the state No. AY1 when the third line current comparison signal HW changes first.

Subsequently, between the two signals having an identical signal level out of the first, second and third line current comparison signals HU, HV and HW at the timing of the leading edge of the state updating timing signal CLK10, when the signal other than the signal that has changed first switches, the state shifts so that the third figure of each state No. having the same first and second figures becomes two.

For example, in the case of No. AX1, the state shifts from No. AX1 to No. AX2. In the case of No. AY1, the state shifts from No. AY1 to No. AY2.

Subsequently, the state is maintained until the timing of the next leading edge of the state updating timing signal CLK10.

Finally, explanation will be made to a case where the system state shifts to the state No. G00 or H00 at the timing of the leading edge of the state updating timing signal CLK10. In any one of these cases, the state is maintained until the next leading edge of the state updating timing signal CLK10 is inputted. Therefore, the first, second and third switching command signals PU, PV and PW are maintained so as to output the levels thereof.

The above-mentioned explanation is how to read Table 1. An operation of the logic circuit 10 will be described below based on the truth table of Table 1.

First of all, explanation will be made to the operation at the timing of the leading edge of the state updating timing signal CLK10.

The logic circuit 10 reads the signal levels of the first, second and third line current comparison signals HU, HV and HW at the timing of the leading edge of the state updating timing signal CLK10, and the signal levels of the output signals PU, PV and PW of the logic circuit 10 are determined so that changes are made in a direction in which the first, second and third detected line currents iFU, iFV and iFW at the timing are made to approach the first, second and third line current command signals iTU, iTV and iTW, i.e., the detected line currents iFU, iFV and iFW are made to correspond to the respective line current command signals. Consequently, the output signals PU, PV and PW become signal levels obtained by inverting those of the comparison signals HU, HV and HW, respectively. For example, when the comparison signal HU is the H-level, the output signal PU is determined to have the L-level. When the comparison signal HU has the L-level, the output signal PU is determined to have the H-level. The output signals PV and PW are determined in a manner similar to the above-mentioned manner.

Next, explanation will be made to the operation of the logic circuit 10 for a time interval from the timing of a leading edge of the state updating timing signal CLK10 to the timing of the next leading edge of the state updating timing signal CLK10.

The operation for the time interval depends on the levels of the three comparison signals HU, HV and HW at the timing of each leading edge of the state updating timing signal CLK10.

In the present case, paying attention to the signal levels of the three comparison signals HU, HV and HW, references will be made below to the operation separately in a case where one signal level out of the three signal levels is different, i.e., when (HU, HV, HW)=(L, H, H)
or=(H, L, H)
or=(H, H, L)
or=(H, L, L)
or=(L, H, L)
or=(L, L, H)

and in another case where all the three signal levels are an identical level, i.e., when (HU, HV, HW)=(H, H, H)
or=(L, L, L).

First of all, explanation will be made to the operation in the case where one signal level out of the three signal levels of the comparison signals HU, HV and HW is different from the others at the timing of the leading edge of the state updating timing signal CLK10.

In regard to the line currents of the three-phase motor 1, it is axiomatic that a value obtained by inverting the polarity of the sum of two line currents out of three line currents is the remaining line current. Therefore, in the logic circuit 10 of the first preferred embodiment according to the present invention, paying attention to two signals having an identical level out of the three comparison signals HU, HV and HW at the timing of the leading edge of the state updating timing signal CLK10, the levels of the switching command signals PU, PV and PW are determined so as to control the turning-on and turning-off of the main circuit switching power devices which supply the line currents relevant to the two signals.

That is, first of all, with regard to the turning-on and turning-off of the main circuit switching power device which supplies the line current relevant to the signal whose level is inverted first of all out of the two signals having the identical level, the level of the corresponding switching command signal is inverted in such a manner that, in the case of the on-state it is switched from the on-state to off-state, while in the case of off-state it is switched from off-state to the on-state. Subsequently, when the level of the remaining one signal out of the two signals having the identical level is inverted, the level of the corresponding switching command signal is inverted so that the main circuit switching power device which supplies the line current relevant to the signal whose level is inverted is switched between the on-state and off-state in a similar manner.

In this timing, the three signals of the first, second and third switching command signals PU, PV and PW outputted from the logic circuit 10 have an identical level, so that the signal levels coincide with the level of the signal having the level different from the others of the three comparison signals HU, HV and HW at the timing of the leading edge of the state updating timing signal CLK10. Until the timing of the next leading edge of the state updating timing signal CLK10, the output signals PU, PV and PW are maintained to have their levels, respectively. After the timing of the next leading edge of the state updating timing signal CLK10, a similar operation will be repetitively executed.

Next, explanation will be made to the operation in the case where all the three signals HU, HV and HW have an identical level at the timing of the leading edge of the state updating timing signal CLK10.

When all the three comparison signals HU, HV and HW have an identical level, the signal levels of the output signals PU, PV and PW determined at the timing of the leading edge of the state updating timing signal CLK10 are maintained until the timing of the next leading edge of the state updating timing signal CLK10.

The above explains the structure of the current controller 6 of the current command type PWM inverter system of the first preferred embodiment according to the present invention. The structure of the logic circuit 10 of the current controller 6 of the current command type PWM inverter in the first preferred embodiment according to the present invention will be described below in more detail.

The inner structure of the logic circuit 10 will be described with reference to FIG. 2.

Figure 2:
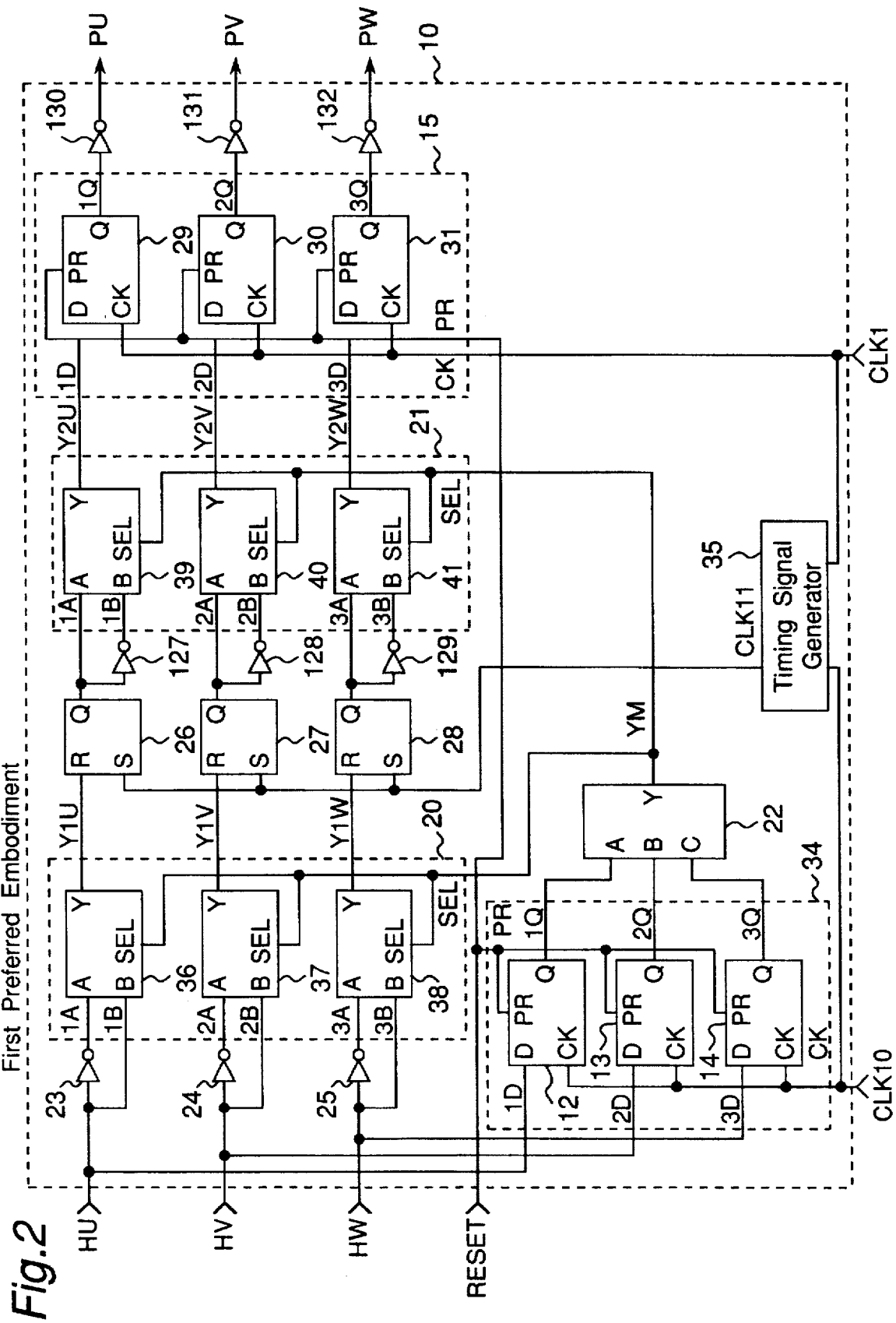
FIG. 2 is a block diagram of a logic circuit shown in FIG. 1.

Referring to FIG. 2, first of all, an operation of the constituent components thereof will be described.

First of all, each of first, second, third, fourth, fifth and sixth data selectors 36, 37, 38, 39, 40 and 41 operates to output the level of an input terminal B at an output terminal Y when an input terminal SEL is at the H-level, and output the level of an input terminal A at the output terminal Y when the input terminal SEL is at the L-level.

The reference numerals 26, 27 and 28 respectively denote first, second and third reset-preferential RS flip-flops, each of which is reset when an input terminal R is at the H-level and an input terminal S is at the L-level so that the level at an output terminal Q is changed to the L-level, each of which is set when the input terminal R is at the L-level and the input terminal S is at the H-level so that the level at the output terminal Q is changed to the H-level, and each of which is reset when the input terminal R is at the H-level and the input terminal S is at the H-level with the priority given to the reset so that the level at the output terminal Q is switched to the L-level.

The reference numerals 29, 30, 31, 12, 13 and 14 respectively denote first, second, third, fourth, fifth and sixth delay type latches (referred to as D-latches hereinafter), each of which latches the level of an input terminal D at the timing of the leading edge of the signal inputted to an input terminal CK, and then outputs the latched level to an output terminal Q. It is to be noted that an input terminal PR is a terminal for receiving a preset signal, and each of the D-latches is preset with the most priority when the H-level is inputted thereto, and then outputs the H-level at the output terminal Q.

The reference numerals 23, 24, 25, 127, 128, 129, 130, 131 and 132 respectively denote first, second, third, fourth, fifth, sixth, seventh, eighth and ninth invertor gates, each of which operates to output the L-level at its output terminal when the H-level is inputted to its input terminal, and operates to output the H-level at its output terminal when the L-level is inputted to the input terminal.

The reference numeral 22 denotes a data decoder having input terminals At B and C and an output terminal Y, and the truth table thereof is shown in Table 2. It is to be noted that the truth table of Table 2 can be easily implemented by AND gates, OR gates and inverter gates.

TABLE 2

| INPUT | | | OUTPUT |
|---|---|---|---|
| A | B | C | $Y = A \cdot B \cdot C + \bar{A} \cdot \bar{B} \cdot C + \bar{A} \cdot B \cdot \bar{C} + A \cdot \bar{B} \cdot \bar{C}$ |
| L | L | L | L |
| L | L | H | H |
| L | H | L | H |
| L | H | H | L |
| H | L | L | H |
| H | L | H | L |
| H | H | L | L |
| H | H | H | H |

A timing signal generator 35 receives a periodical system clock CLK1, which is periodically generated in synchronization with the system clock CLK10 with a frequency being a plurality of times the frequency of the state updating timing signal CLK10, and then, outputs a state updating timing delay signal CLK11.

Figure 4:
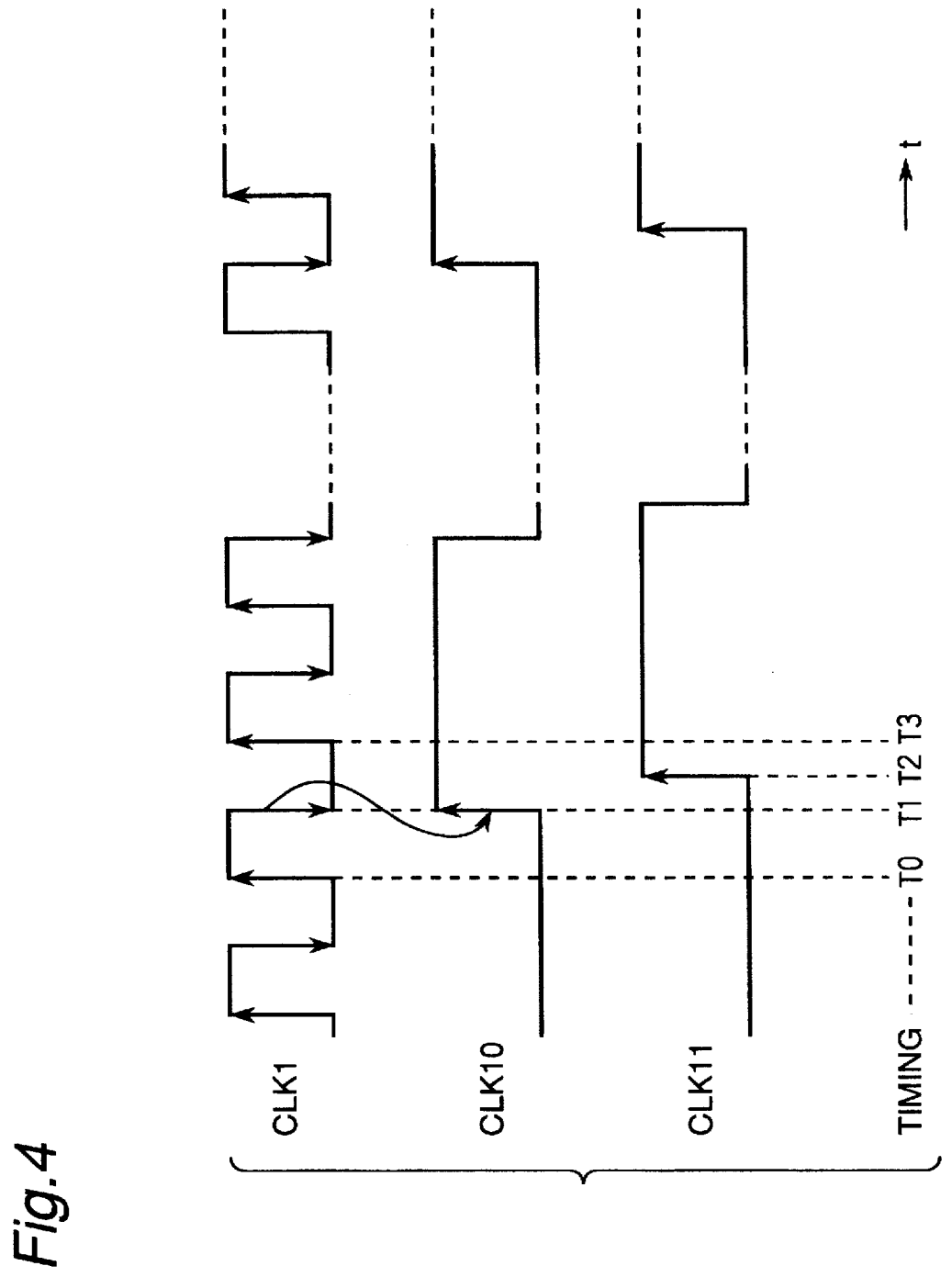
FIG. 4 is a timing chart of respective clocks generated by a timing signal generator of the logic circuit shown in FIG. 1.

The explanation of relationships among the clock signals CLK1, CLK10 and CLK11 is provided here with reference to FIG. 4.

First of all, it is assumed that the cycle of the state updating timing signal CLK10 is sufficiently greater than the cycle of the system clock CLK1, and the state updating timing signal CLK10 changes in synchronization with a trailing edge of the system clock CLK1. It is further assumed that the state updating timing delay signal CLK11 is a signal obtained by delaying the state updating timing signal CLK10 by about half the time interval between the leading edge and the trailing edge of the system clock CLK1.

The above describes the operations of the constituent components. Explanation will be then made to the operation of the logic circuit 10 according to the flow of signals.

In the present case, for the sake of simplicity of explanation, the first, second and third data selectors 36, 37 and 38 are collectively referred to as a first data selector circuit 20, while the fourth, fifth and sixth data selectors 39, 40 and 41 are collectively referred to as a second data selector 21. Further, the fourth, fifth and sixth D-latches 12, 13 and 14 are collectively referred to as a first data latch circuit 34, while the first, second and third D-latches 29, 30 and 31 are collectively referred to as a second data latch circuit 15.

The input terminals A of the first, second and third data selectors 36, 37 and 38 are made to serve respectively as input terminals 1A, 2A and 3A of the first data selector circuit 20, and their input terminals B are made to serve respectively as input terminals 1B, 2B and 3B of the first data selector circuit 20. Their input terminals SEL are commonly connected with each other to serve as an input terminal SEL of the first data selector circuit 20. The input terminals A of the fourth, fifth and sixth data selectors 39, 40 and 41 are made to serve respectively as input terminals 1A, 2A and 3A of the second data selector circuit 21, and their input terminals B are made to serve respectively as input terminals 1B, 2B and 3B of the second data selector circuit 21. Their input terminals SEL are commonly connected with each other to serve as an input terminal SEL of the second data selector circuit 21. The input terminals D of the fourth, fifth and sixth D-latches 12, 13 and 14 are made to serve as input terminals 1D, 2D and 3D of the first data latch circuit 34, and their input terminals CK are commonly connected with each other to serve as an input terminal CK of the first data latch circuit 34. Their input terminals PR are commonly connected with each other to serve as an input terminal PR of the first data latch circuit 34, and their output terminals Q are made to serve respectively as output terminals 1Q, 2Q and 3Q of the first data latch circuit The input terminals D of the first, second and third D-latches 29, 30 and 31 are made to serve as input terminals 1D, 2D and 3D of the second data latch circuit 15, and their input terminals CK are commonly connected with each other to serve as an input terminal CK of the second data latch circuit 15. Their input terminals PR are commonly connected with each other to serve as an input terminal PR of the second data latch circuit 15, and their output terminals Q are made to serve respectively as output terminals 1Q, 2Q and 3Q of the second data latch circuit 15.

Furthermore, the output signals of the first data selector circuit 20 are referred to as first selection output signals Y1U, Y1V and Y1W, while the output signals of the second data selector circuit 21 are referred to as second selection output signals Y2U, Y2V and Y2W.

First of all, the first, second and third line current comparison signals HU, HV and HW are inputted to the input terminals 1D, 2D and 3D of the first data latch circuit 34, are inputted to the input terminals 1B, 2B and 3B of the first data selector circuit 20, and are further inputted to the input terminals 1A, 2A and 3A via the first, second and third invertor gates 23, 24 and 25.

Reference is made here to a state in which the state updating timing signal CLK10 changes from the L-level to the H-level, i.e., just after its leading edge is inputted, namely, a timing T1 shown in FIG. 4. First of all, the input levels at the input terminals 1D, 2D and 3D of the first data latch circuit 34 are latched to be held by the first data latch circuit 34, and then, are outputted to the output terminals 1Q, 2Q and 3Q. This state of the first data latch circuit 34 does not change until the next leading edge of the state updating timing signal CLK10 is inputted. Then, the output signals outputted from the output terminals 1Q, 2Q and 3Q of the first data latch circuit 34 are inputted to the data decoder 22, so that the output terminal Y is made to have the H-level or the L-level according to the truth table shown in Table 2. The signal outputted from the output terminal Y is referred to as a mode signal YM.

In the present case, the mode signal YM is inputted to the input terminals SEL of the first data selector circuit 20, and the first data selector circuit 20 outputs the first selection output signals Y1U, Y1V and Y1W in accordance with the mode signal YM.

Then, the state updating timing delay signal CLK11 changes from the L-level to the H-level, i.e., its leading edge is inputted. A state just after the above-mentioned timing T2 shown in FIG. 4 will be described.

First of all, the state updating timing delay signal CLK11 is inputted to the input terminals S of the first, second and third RS flip-flops 26, 27 and 28, and the flip-flops are set when the signal CLK11 is at the H-level. However, as described hereinbefore, each of the first, second and third RS flip-flops 26, 27 and 28 is a reset-preferential RS flip-flop, and therefore, the priority is given to the reset when the input terminal R is at the H-level. Therefore, among the first, second and third RS flip-flops 26, 27 and 28, any RS flip-flop having the L-level at the input terminal R is only set consequently when the state updating timing delay signal CLK11 is at the H-level.

The output signals of the first, second and third RS flip-flops 26, 27 and 28 are inputted to the input terminals 1A, 2A and 3A of the second data selector circuit 21, and are inputted to their input terminals 1B, 2B and 3B via the fourth, fifth and sixth inverter gates 127, 128 and 129. To the input terminals SEL of the second data selector circuit 21 is inputted the mode signal YM. Therefore, in accordance with the mode signal YM, the second data selector circuit 21 outputs the second selection output signals Y2U, Y2V and Y2W.

Then, the system clock CLK1 changes from the L-level to the H-level, i.e., its leading edge is inputted. A state just after the above-mentioned timing T3 as shown in FIG. 4 will be described.

First of all, when the leading edge of the system clock CLK is inputted to the input terminals CK of the second data latch circuit 15, the second data latch circuit 15 receives the second selection output signals Y2U, Y2V and Y2W from its input terminals 1D, 2D and 3D and latches the same. The second data latch circuit 15 outputs at its output terminals 1Q, 2Q and 3Q the latched input signals obtained from the input terminals 1D, 2D and 3D. Each of the output signals is maintained until the timing of the next leading edge of the state updating timing signal CLK10. The output signals outputted from the output terminals 1Q, 2Q and 3Q of the second data latch circuit 15 are made to serve as the first second and third switching command signals PU, PV and PW via the seventh, eighth and ninth inverter gates 130, 131 and 132.

In the present case, the first, second and third switching command signals PU, PV and PW are updated in accordance with the timing at which the leading edge of the system clock CLK1 is inputted to the input terminals CK of the second data latch circuit 15. Therefore, the first, second and third switching command signals PU, PV and PW do not change at the timing T1 and the timing T2.

The above describes the operations (a) at the timing T1 at which the state updating timing signal CLK10 changes from the L-level to the H-level, (b) at the timing T2 at which the state updating timing delay signal CLK11 switches from the L-level to the H-level, and (c) at the timing T3 at which the system clock CLK1 switches from the L-level to the H-level.

The above describes the operations at which the state updating timing signal CLK10 rises (its leading edge is inputted), describing the state shift to the eight state Nos. A00, B00, C00, D00, E00, F00, G00 and H00 in Table 1.

Next, explanation will be made to the subsequent operation, i.e., the operation for a time interval until the timing at which the next leading edge of the state updating timing signal CLK10 is inputted.

Here, first of all, explanation will be made to a case where the system state shifts to any one of the state Nos. A00, B00, C00, D00, E00 and F00 in Table 1, i.e., there are two signals having an identical signal level among the first, second and third line current comparison signals HU, HV and HW at the timing of the leading edge of the state updating timing signal CLK10. The explanation will be provided here taking the state No. A00 in Table 1 as an example.

In the state of the state No. A00, the line current comparison signal HU is at the L-level, the line current signal HV is at the H-level, the line current signal HW is at the H-level, the mode signal YM is at the L-level, the output signals Y1U, Y1V and Y1W from the first data selector circuit 20 are respectively at the H-level, the L-level and the L-level, the first RS flip-flop 26 is in reset state, the Second RS flip-flop 27 is in set state, and the third RS flip-flop 28 is in set state.

Further, the output signals Y2U, Y2V and Y2W from the second data selector circuit 21 are respectively at the L-level, the H-level and the H-level.

Here, we first of all consider an operation in the case where the second line current comparison signal HV changes from the H-level to the L-level, i.e., an operation of the state shift from the state No. A00 to the state No. AX1 in Table 1.

When the second line current comparison signal HV changes from the H-level to the L-level, the level of the first selection output signal Y1V changes from the L-level to the H-level, thereby resetting the second RS flip-flop 27. Therefore, the second selection output signal Y2V is changed from the H-level to the L-level.

Therefore, the switching command signals PU, PV and PW become (PU, PV, PW)=(H, H, L)

at the timing of the next leading edge of the system clock CLK1. In accordance with the first, second and third switching command signals PU, PV and PW, the main circuit power controller 8 at the next stage operates.

Next, we consider an operation when the third line current comparison signal HW subsequently changes from the H-level to the L-level, i.e., an operation of the state shift from the state No. AX1 to the state No. AX2 in Table 1.

When the third line current comparison signal HW changes from the H-level to the L-level, the level of the first selection output signal Y1W changes from the L-level to the H-level, thereby resetting the third RS flip-flop 28. Therefore, the second selection output signal Y2W is changed from the H-level to the L-level.

Therefore, the switching command signals PU, PV and PW become (PU, PV, PW)=(H, H, H)

at the timing of the next leading edge of the system clock CLK1. In accordance with the first, second and third switching command signals PU, PV and PW, the main circuit power controller 8 at the next stage operates.

This state, i.e., (PU, PV, PW)=(H, H, H)

is maintained until the timing of the leading edge of the system clock CLK1 subsequent to the timing of the next leading edge of the state updating timing signal CLK10.

The above describes the operations in the case where the system state shifts to any one of the state Nos. A00, B00, C00, D00, E00 and F00 at the timing of the leading edge of the state updating timing signal CLK10, i.e., there are two signals having an identical signal level out of the first, second and third line current comparison signals HU, HV and HW at the timing of the leading edge of the state updating timing signal CLK10. Next, explanation will be made to a case where the system state shifts to either one of the state Nos. G00 and H00 in Table 1, i.e., all the first, second and third line current comparison signals HU, HV and HW are at an identical signal level at the timing of the leading edge of the state updating timing signal CLK10.

The explanation will be provided here taking the state No. G00 in Table 1 as an example.

In the state of the state No. G00, the line current comparison signal HU is at the H-level, the line current comparison signal HV is at the H-level, the line current comparison signal HW is at the H-level, the mode signal YM is at the H-level, the output signals Y1U, Y1V and Y1W from the first data selector circuit 20 are respectively at the H-level, the H-level and the H-level, and all the first, second and third RS flip-flops 26, 27 and 28 are in the reset state.

Consequently, the output signals Y2U, Y2V and Y2W from the second data selector circuit 21 are respectively at the H-level, the H-level and the H-level. Therefore, the switching command signals PU, PV and PW become the L-level, the L-level and the L-level, respectively, at the timing of the next leading edge of the system clock CLK1. In accordance with these switching command signals PU, PV and PW, the main circuit power controller 8 at the next stage operates.

This state, i.e.,
(PU, PV, PW)=(L, L, L)
is maintained until the timing of the leading edge of the system clock CLK subsequent to the timing of the next leading edge of the state updating timing signal CLK10.

The above describes the operations in the case where the system state shifts from the state No. A00 to the state No. AX1 and then further from the state No. AX1 to the state No. AX2 in Table 1 and the operations in the case where the system state shifts to the state No. G00 at the timing of the leading edge of the state updating timing signal CLK10. From the explanation provided above, the other state shift cases in Table 1 can be similarly considered, and therefore, no explanation is provided therefor.

The above describes the operation of the logic circuit 10 in the current controller 6 of the current command type PWM inverter system of the first preferred embodiment according to the present invention. Explanation will be then made to line current control of the three-phase motor 1 by means of the current command type PWM inverter system of the first preferred embodiment according to the present invention with reference to FIGS. 3A through 3C.

Referring to FIGS. 3A through 3C, FIG. 3A is a timing chart of the first, second and third line current command signals iTU, iTV and iTW and the first, second and third detected line currents iFU, iFV and iFW. FIG. 3B is an enlarged timing chart showing the operation of the logic circuit 10 in the region enclosed by dotted lines of FIG. 3A. FIG. 3C is a timing chart showing the turning-on and turning-off operations of the first, second, third, fourth, fifth and sixth main circuit switching power devices Q1, Q2, Q3, Q4, Q5 and Q6 based on the output levels of the first, second and third switching command signals PU, PV and PW outputted from the logic circuit 10.

First of all, explanation will be made to a timing at which a timing t=t1, i.e., the timing of the leading edge of the state updating timing signal CLK10.

At the timing t=t1 when the signals iTU, iTV and iTW and iFU, iFV and iFW at the timing of the leading edge of the state updating timing signal CLK10 have the following magnitude relationships:
iTU>iFU,
iTV<iFV, and
iTW<iFW,
then the first, second and third line current comparison signals HU, HV and HW become the following states:

(HU, HV, HW)=(L, H, H).

The above-mentioned states correspond to the state No. A00 in the truth table of Table 1, and the switching command signals PU, PV and PW outputted from the logic circuit 10 become the following states:
(PU, PV, PW)=(H, L, L)
and then, the switching command signals PU, PV and PW are transmitted to the main circuit power controller 8.

Then, the main circuit switching power devices Q1, Q2, Q3, Q4, Q5 and Q6 are respectively turned on, off, off, off, on and on, so that the detected line currents iFU, iFV and iFW approach the line current command signals iTU, iTV and iTW according to the electric time constant of the three-phase motor 1.

The above describes the operations of the current command type PWM inverter at the timing of the leading edge of the state updating timing signal CLK10 at the timing t=t1.

Next, explanation will be made to the operation in the case where iTV>iFV and a state shift takes place at the timing (timing t=t11) from
(HU, HV, HW)=(L, H, H) to
(HU, HV, HW)=(*, L, H).

Since the level of the comparison signal HU is ignored, it is assumed that the comparison signal HU=* means DON'T CARE for the convenience of explanation, and the symbol "*" means DON'T CARE hereinafter.

The logic circuit 10 receives the first, second and third line current comparison signals HU, HV and HW, switches the first, second and third switching command signals PU, PV and PW from
(PU, PV, PW=(H, L, L) to
(PU, PV, PW=(H, H, L)
and then turns the main circuit switching power devices Q2 and Q5 on and off, respectively. Then the state shifts to the state No. AX1.

The above describes the operation at timing t=t11.

Next, explanation will be made to the operation in the case where iTW>iFW and a state shift takes place at the timing (timing t=t12) from
(HU, HV, HW)=(*, L, H) to
(HU, HV, HW)=(*, H, H).

The logic circuit 10 receives the first, second and third line current comparison signals HU, HV and HW, switches the first, second and third switching command signals PU PV and PW from
(PU, PV, PW)=(H, H, L) to
(PU, PV, PW)=(H, H, H)
and turns the main circuit switching power devices Q3 and Q6 on and off, respectively. Then the state shifts to the state No. AX2).

The above describes the operation at timing t=t12.

Then, the state of
(PU, PV, PW)=(H, H, H)
is maintained until the timing of the next leading edge of the state updating timing signal CLK10.

Further, by executing a similar operation after the timing of the next leading edge of the state updating timing signal CLK10, the line currents of the three-phase motor 1 are controlled so that the line currents thereof conform to the first, second and third line current command signals iTU, iTV and iTW.

The above describes the line current control of the three-phase motor 1 with the current command type PWM inverter system of the first preferred embodiment according to the present invention.

In FIG. 1, the first, second and third comparators 17, 18 and 19 can be made to have hysteresis, when noises superimposed on the first, second and third line current command signals iTU, iTV and iTW as well as the first, second and third detected line currents iFU, iFV and iFW can be of course reduced.

Referring to FIG. 7, in the base driving circuit 4 which controls the main circuit switching power devices Q1, Q2, Q3, Q4, Q5 and Q6 based on the output levels of the outputs PU, PV and PW of the current controller 6, it may be acceptable to provide a delay for a predetermined timing when each of the main circuit switching power devices Q1, Q2, Q3, Q4, Q5 and Q6 shifts from the off-state to the on-state to assure speedy shift from the on-state to the off-state. This arrangement means as follows. For example, when the state when the power device Q1 is in the on-state and the power device Q4 is in the off-state is shifted to the state when the power device Q1 is in the off-state and the power device Q4 is in the on-state, first of all, the power device Q1 is turned off, and after the power device Q1 is surely turned off, the power device Q4 is turned on. With this arrangement, the power devices Q1 and Q4 are momentarily turned on simultaneously in accordance with the timing at which the power devices Q1 and Q4 are switched, so that a great current can be prevented from flowing through the main circuit switching power devices Q1 to Q6.

Further, the output levels of the base drivers of the base driving circuit 4 may be made to the L-levels, respectively, so that all the power devices are turned off, for example, when it is desired to effect a current cutoff for protecting the current command type PWM inverter in the case of overload, a free-run operation of the motor or the like.

According to the first preferred embodiment of the present invention, due to the structure without any current error amplifier, the problems concerning the gain control of the current error amplifiers can be substantially solved, thereby totally obviating the need of the gain control.

Furthermore, even when the characteristics and specifications of the three-phase motor 1, the motor current detector circuit 9, the current controller 6 and the main circuit power controller 8 change, the inverter system of the present preferred embodiment operates so that each line current error is consistently minimized. Furthermore, even when there are manufacturing-dependent variation of characteristics, temperature characteristics and the like, the inverter system of the present preferred embodiment operates so that each line current error is consistently minimized, thereby assuring a better current control responsibility and preventing the possible occurrence of an oscillation phenomenon.

Furthermore, the current controller 6 of the current command type PWM inverter system according to the present invention can be implemented by a simple digital circuit except for the first, second and third comparators, and therefore, the part constituted by the digital circuit does not cause any offset and drift and costs less.

Therefore, the present invention is made free from the gain adjustment work and the offset adjustment work of the current error amplifiers 120, 121 and 122, so that a better current control responsibility can be assured to allow an inexpensive current command type PWM inverter system to be provided.

Second Preferred Embodiment

A second preferred embodiment according to the present invention will be described below with reference to the accompanying drawings.

Figure 5:
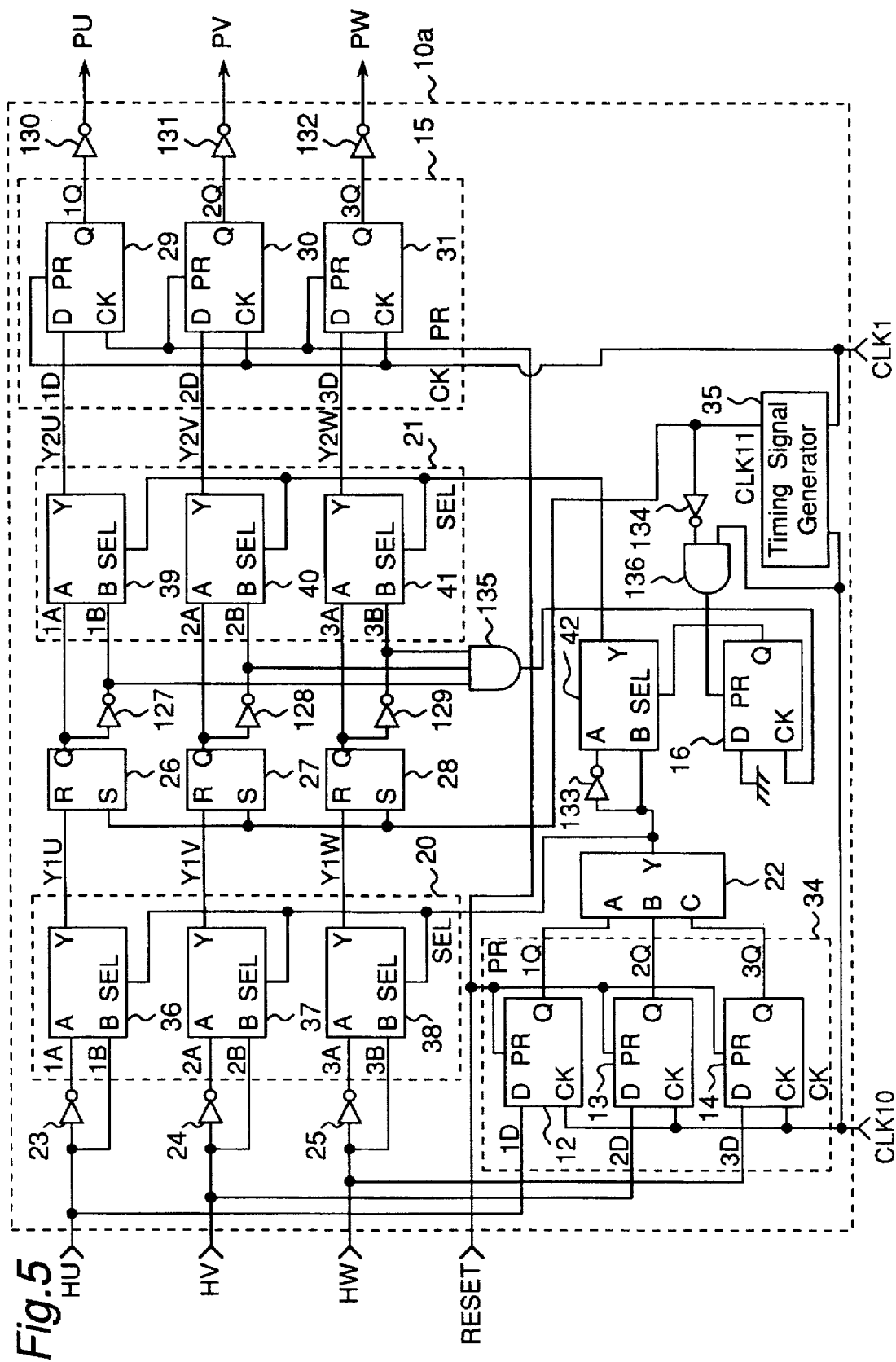
FIG. 5 is a block diagram of a logic circuit of a second preferred embodiment according to the present invention.

According to the second preferred embodiment of the present invention, in the current controller 6 of the current command type PWM inverter shown in FIG. 7, the internal structure of the logic circuit 10a provided for the current controller 6 having the structure shown in FIG. 1 is made to be different from that of the first preferred embodiment as shown in FIG. 5.

The structure of the other part except for the internal structure of the logic circuit 10a is quite the same as those of the first preferred embodiment. Therefore, no detailed explanation is provided for the structure of the current controller 6 shown in FIG. 1 provided with the logic circuit 10a of the second preferred embodiment and the structure of the current command type PWM inverter system as shown in FIG. 7 provided with the current controller 6. The structure and operation of the logic circuit 10a will be described below.

First of all, prior to the explanation of the logic circuit 10a, the truth table of the logic circuit 10a is shown in Table 3.

TABLE 3

| State No. | Reset Signal RESET | State Updating Timing Signal CLK10 | Line Current Comparison signal | | | Switching Command Signal | | |
|---|---|---|---|---|---|---|---|---|
| | | | HU | HV | HW | PU | PV | PW |
| A00 | L | ↑ | L | H | H | H | L | L |
| AX1 | L | + | * | L | H | H | H | L |
| AX2 | L | + | * | L | L | L | L | L |
| A00 | L | ↑ | L | H | H | H | L | L |
| AY1 | L | + | * | H | L | H | L | H |
| AY2 | L | + | * | L | L | L | L | L |
| B00 | L | ↑ | H | L | H | L | H | L |
| BX1 | L | + | L | * | H | H | H | L |
| BX2 | L | + | L | * | L | L | L | L |
| B00 | L | ↑ | H | L | H | L | H | L |
| BY1 | L | + | H | * | L | L | H | H |
| BY2 | L | + | L | * | L | L | L | L |
| C00 | L | ↑ | H | H | L | L | L | H |
| CX1 | L | + | L | H | * | H | L | H |
| CX2 | L | + | L | L | * | L | L | L |
| C00 | L | ↑ | H | H | L | L | L | H |
| CY1 | L | + | H | L | * | L | H | H |
| CY2 | L | + | L | L | * | L | L | L |
| D00 | L | ↑ | H | L | L | L | H | H |

TABLE 3-continued

| State No. | Reset Signal RESET | State Updating Timing Signal CLK10 | Line Current Comparison signal | | | Switching Command Signal | | |
|---|---|---|---|---|---|---|---|---|
| | | | HU | HV | HW | PU | PV | PW |
| DX1 | L | + | * | H | L | L | L | H |
| DX2 | L | + | * | H | H | H | H | H |
| D00 | L | ↑ | H | L | L | L | H | H |
| DY1 | L | + | * | L | H | L | H | L |
| DY2 | L | + | * | H | H | H | H | H |
| E00 | L | ↑ | L | H | L | H | L | H |
| EX1 | L | + | H | * | L | L | L | H |
| EX2 | L | + | H | * | H | H | H | H |
| E00 | L | ↑ | L | H | L | H | L | H |
| EY1 | L | + | L | * | H | H | L | L |
| EY2 | L | + | H | * | H | H | H | H |
| F00 | L | ↑ | L | L | H | H | H | L |
| FX1 | L | + | H | L | * | L | H | L |
| FX2 | L | + | H | H | * | H | H | H |
| F00 | L | ↑ | L | L | H | H | H | L |
| FY1 | L | + | L | H | * | H | L | L |
| FY2 | L | + | H | H | * | H | H | H |
| G00 | L | + | H | H | H | L | L | L |
| H00 | L | + | L | L | L | H | H | H |
| CLR | H | + | * | * | * | L | L | L |

Reading Table 3 is quite the same as reading the truth table (Table 1) of the logic circuit 10 of the first preferred embodiment, and therefore, no explanation is provided for how to read Table 3.

In regard to the operation of the logic circuit 10a based on the truth table of Table 3, no explanation is provided for the same parts of operation as those of the logic circuit 10 of the first preferred embodiment.

The logic circuit 10a receives the first, second and third line current comparison signals HU, HV and HW at the timing of the leading edge of the state updating timing signal CLK10, and based on these comparison signals HU, HV and HW, the signal levels of the switching command signals PU, PV and PW are determined quite in the same manner as in the logic circuit 10 of the first preferred embodiment.

Next, explanation will be made below to the operation of the logic circuit 10a until the timing of the next leading edge of the state updating timing signal CLK10 separately in the case where one signal level is different from the others among the three signal levels, i.e., when (HU, HV, HW)=(L, H, H)

or=(H, L, H)

or=(H, H, L)

or=(H, L, L)

or=(L, H, L)

or=(L, L, H)

and in another case where the three signal levels are all at an identical level, i.e., when (HU, HV, HW)=(H, H, H)

or=(L, L, L)

in a manner similar to that of the explanation of the operation of the logic circuit 10 of the first preferred embodiment.

First of all, explanation will be made to the operation in the case where one signal level is different from the others among the three signal levels of the comparison signals HU, HV and HW at the timing of the leading edge of the state updating timing signal CLK10.

With regard to the operation in the case where one signal level is different from the others among the three signal levels of the comparison signals HU, HV and HW at the timing of the leading edge of the state updating timing signal CLK10, the level of the corresponding switching command signal is inverted so that the main circuit switching power device which supplies the line current relevant to the signal that has been inverted before out of the two signals having an identical level is controlled to be turned on when the power device is in the off-state, and is controlled to be turned off when the power device is in the on-state quite in the same manner as in the operation of the logic circuit 10 of the first preferred embodiment. However, the logic circuit of the present preferred embodiment operates in a manner different from that of the logic circuit 10 of the first preferred embodiment in that, when the level of the other one of the two signals that have had the identical level is inverted, the on-state or the off-state of the main circuit switching power device which supplies the line current relevant to the signal that has been inverted is not switched subsequently, and the level of only one signal of the other two switching command signals is inverted again.

At this timing, the three switching command signals PU, PV and PW outputted from the logic circuit 10a have an identical level. However, the levels of the three switching command signals PU, PV and PW have such a relationship that their signal levels are inverted from the signal levels in the first preferred embodiment, respectively, i.e., the levels of the three switching command signals PU, PV and PW become the levels obtained by inverting the level of one signal having the level different from those of the others among the three comparison signals HU, HV and HW at the timing of the leading edge of the state updating timing signal CLK10. The levels of the switching command signals PU, PV and PW are maintained until the timing of the next leading edge of the state updating timing signal CLK10. Then, after the timing of the next leading edge of the state updating timing signal CLK10, the similar operation will be repeated.

Then, the similar operation is executed when all the levels of the three comparison signals HU, HV and HW are at an identical level at the timing of the leading edge of the state updating timing signal CLK10, and therefore, no explanation is provided therefor.

The above describes the structure of the current controller 6 in the current command type PWM inverter system of the second preferred embodiment according to the present invention. The structure of the logic circuit 10a of the current controller 6 in the current command type PWM inverter system of the second preferred embodiment according to the present invention will be described below in more detail.

The internal structure of the logic circuit 10a will be described with reference to FIG. 5 in regard to a point different from that of the first preferred embodiment.

Referring to FIG. 5, first of all, explanation will be made to the operation of constituent components newly provided for the logic circuit 10 of the first preferred embodiment.

The reference numerals 135 and 136 denote first and second AND circuits. When the H-level is inputted to all the three input terminals of the first AND circuit 135 or to both input terminals of the second AND circuit 136, the signal having the H-level is outputted from each output terminal thereof. When at least one of the input terminals is at the L-level, the signal having the L-level is outputted from each output terminal thereof.

There are newly provided a seventh data selector 42, a seventh D-latch 16, and tenth and eleventh inverter gates 133 and 134 as other constituent components. Operations of these constituent components are quite the same as those of the first preferred embodiment, and therefore no explanation is provided therefor.

With the above-mentioned constituent components, the output terminal Y of the data decoder 22 is connected to the input terminal A of the seventh data selector 42 via the tenth inverter gate 133, and is directly connected to the input terminal B. The output terminal Y of the seventh data selector 42 is connected to the input terminal SEL of the second data selector circuit 21. The input terminal SEL of the seventh data selector 42 is connected to the output terminal Q of the seventh D-latch 16. The input terminal D of the seventh D-latch 16 is grounded to always have the L-level. The input terminal CK of the seventh D-latch 16 is connected to the output terminal of the first AND circuit 135, while the input terminal PR of the seventh D-latch 16 is connected to the output terminal of the second AND circuit 136.

The three input terminals of the first AND circuit 135 are connected to the output terminals Q of the first, second and third RS flip-flops 26, 27 and 28 via the fourth, fifth and sixth inverter gates 127, 128 and 129, respectively. To one of the two input terminals of the second AND circuit 136 is inputted the state updating timing delay signal CLK11 via the eleventh inverter gate 134, while the state updating timing signal CLK10 is inputted to the other input terminal.

With the above-mentioned arrangement, in the seventh data selector 42, the level inputted to the input terminal B is outputted to the output terminal Y when the seventh D-latch 16 is preset to yield the H-level at the output terminal Q, and when the input terminal CK of the seventh D-latch 16 is switched from the L-level to the H-level, the output terminal Q becomes the L-level, so that the level inputted to the input terminal A is outputted to the output terminal Y of the seventh data selector 42.

The seventh D-latch 16 is preset when the state updating timing delay signal CLK11 is at the L-level and the state updating timing signal CLK10 is at the H-level. The input terminal CK switches from the L-level to the H-level when all the first, second and third RS flip-flops 26, 27 and 28 are reset.

An operation of the logic circuit 10a having the above-mentioned structure will be described below.

Referring to FIG. 4, the state updating timing signal CLK10 has the H-level and the state updating timing delay signal CLK11 has the L-level before the leading edge of the state updating timing delay signal CLK11, so that the seventh D-latch 16 is preset. Therefore, a signal having a level identical to the mode signal YM of the data decoder 22 is inputted to the input terminal SEL of the second data selector circuit 21.

On the other hand, the input terminal SEL of the second data selector circuit 21 is not inverted until all the first, second and third RS flip-flops 26, 27 and 28 are reset. In other words, when all the first, second and third RS flip-flops 26, 27 and 28 are reset, the output terminal Q thereof becomes the L-level, and then, the output level of the AND gate 135 becomes the H-level, the output terminal Q of the D-latch 16 becomes the L-level, then the input terminal SEL of the second data selector circuit 21 is inverted.

Therefore, when the system state shifts to any one of the state Nos. A00, B00, C00, D00, E00 and F00 in Table 3, i.e., when there are two signals having an identical signal level among the first, second and third line current comparison signals HU, HV and HW at the timing of the leading edge of the state updating timing signal CLK10, quite the same operation as that of the first preferred embodiment takes place until the occurrence of such a shift that the level of any one of the three switching command signals PU, PV and PW is inverted from the levels of the switching command signals PU, PV and PW determined at the timing of the leading edge of the state updating timing signal CLK10.

Subsequently, when the remaining one of the comparison signals HU, HV and HW is inverted, all the first, second and third RS flip-flops 26, 27 and 28 are reset, and the level at the input terminal SEL of the second data selector circuit 21 is inverted, so that there occurs a states switching to the levels as indicated by the state Nos. AX2, AY2, BX2 and BY2 in Table 3, i.e., to the levels reverse to the corresponding states in FIG. Table 1.

Each switched level is maintained until the timing of the leading edge of the system clock CLK1 subsequent to the timing of the next leading edge of the state updating timing signal CLK10 in a manner similar to that of the first preferred embodiment.

Next, explanation will be made to the case where the system state shifts to either one of the state Nos. G00 and H00 in Table 1, i.e., when all the first, second and third line current comparison signals HU, HV and HW are at an identical level at the timing of the leading edge of the state updating timing signal CLK10.

Referring to FIG. 4, all the first, second and third RS flip-flops 26, 27 and 28 are reset at the timing of the leading edge of the state updating timing signal CLK10. However, the seventh D-latch is in the preset state and the level of the input terminal SEL of the second data selector circuit 21 does not switch until the timing of the leading edge of the state updating timing delay signal CLK10 . Therefore, the operation in this case is quite the same as that of the first preferred embodiment as shown in the truth table of Table 3.

The above describes the operation of the logic circuit 10a in the current controller 6 of the current command type PWM inverter system of the second preferred embodiment according to the present invention. Comparing Table 1 of the first preferred embodiment with Table 3 of the second preferred embodiment, the present preferred embodiment differs only in the point that the levels of the switching command signals PU, PV and PW at an identical level obtained as a consequence of the final shift of the second preferred embodiment are reverse to the levels of the switching command signals PU, PV and PW of the first preferred embodiment only when the level of one signal out of the three comparison signals HU, HV and HW is different from the others at the timing of the leading edge of the state updating timing signal CLK10.

In regard to the levels of the switching command signals PU, PV and PW, the line voltage of each phase of the three-phase motor 1 becomes zero when the switching command signals PU, PV and PW are identical to each other. Therefore, when the switching command signals PU, PV and PW have either the levels of H, H and H or the levels of L, L and L, there is no change in the line voltage of each phase until the timing of the next leading edge of the state updating timing signal CLK10. Therefore, the second preferred embodiment can control the line currents of the three-phase motor 1 equivalently in a manner similar to that of the first preferred embodiment.

It may be also acceptable to make the switching command signals PU, PV and PW have the levels of H, H and H in the state No. G00 and make the switching command signals PU, PV and PW have the levels of L, L and L in the state No. H00 in Table 3.

Third Preferred Embodiment

A third preferred embodiment according to the present invention will be described below with reference to the accompanying drawings.

Figure 6:
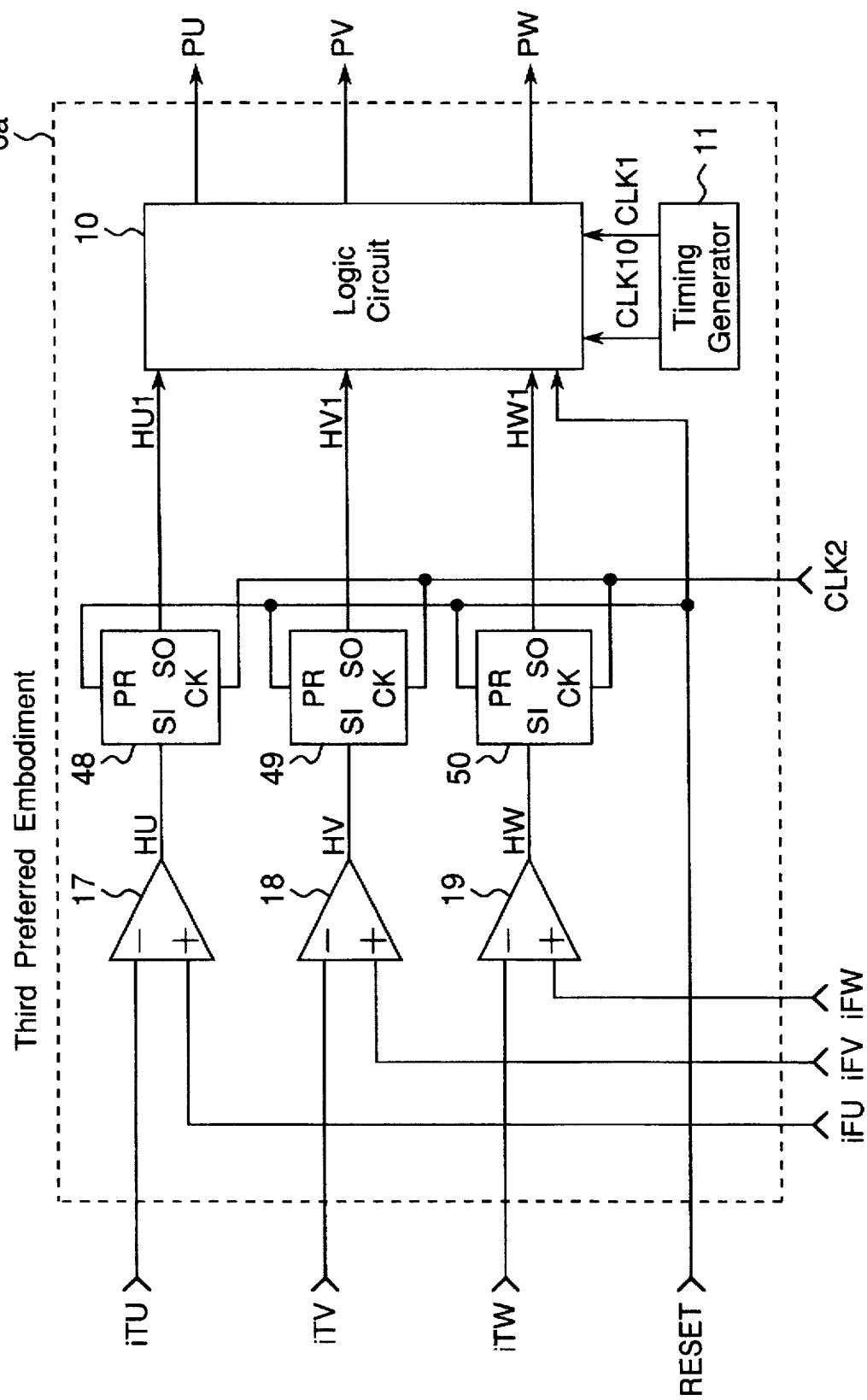
FIG. 6 is a block diagram of a current controller of a third preferred embodiment according to the present invention.

According to the third preferred embodiment of the present invention, the internal structure of the current controller 6 of the current command type PWM inverter system shown in FIG. 7 is made to be different from that of the first preferred embodiment or the second preferred embodiment. FIG. 6 shows the internal structure of the current controller 6 of the third preferred embodiment according to the present invention.

The third preferred embodiment according to the present invention has quite the same structure as that of the first preferred embodiment or the second preferred embodiment except for first, second and third twice-read logic circuits 48, 49 and 50 provided as constituent components of the current controller 6 shown in FIG. 6.

Since the first, second and third twice-read logic circuits 48, 49 and 50 have quite the same structures, the structure of the first twice-read logic circuit 48 will be described below with reference to FIG. 8.

Figure 8:
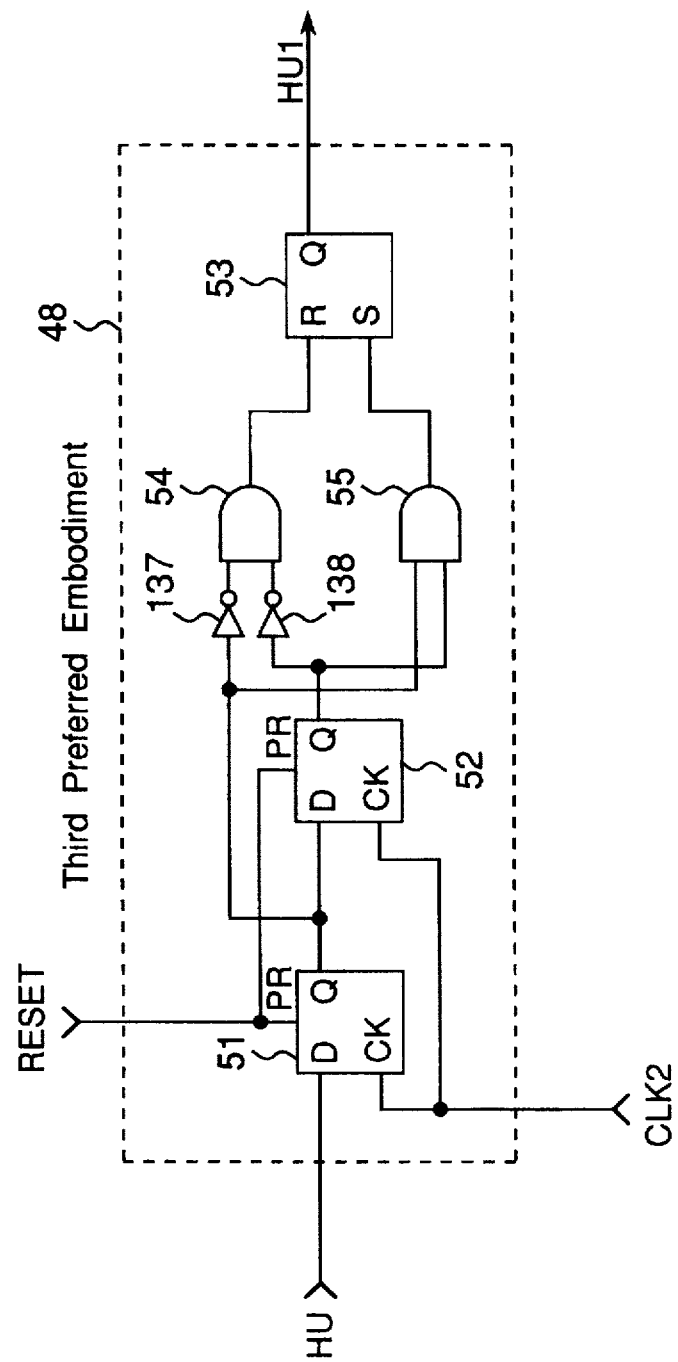
FIG. 8 is a block diagram of a twice-read logic circuit shown in FIG. 6.

Referring to FIG. 8 for explaining the operation of each constituent component of the first twice-read logic circuit 48, first of all, eighth and ninth D-latches 51 and 52 latch the levels at their input terminals D at the timing of the leading edge of the signal inputted to their input terminals CK, and then, output the levels at the input terminals D to their output terminals Q. It is to be noted that their input terminals PR are terminals for receiving the input of a preset signal, and the D-latches 51 and 52 are preset with first priority when the H-level is inputted thereto, when the output terminals Q thereof become the H-level.

Further, the input terminals CK and the input terminals PR of the eighth and ninth D-latches 51 and 52 are commonly connected to each other.

The reference numerals 137 and 138 denote twelfth and thirteenth inverter gates, each of which outputs the L-level at their output terminals when the H-level is inputted to their input terminals, and each of which outputs the H-level at the output terminals when the L-level is inputted to the input terminals.

The reference numeral 53 denotes a fourth RS flip-flop which is reset when its input terminal R is at the H-level and its input terminal S is at the L-level so as to switch the level at its output terminal Q to the L-level, and is set when the input terminal R is at the L-level and the input terminal S is at the H-level so as to switch the level at the output terminal Q to the H-level.

The reference numerals 54 and 55 denote third and fourth AND-circuits 54 and 55, each of which outputs the H-level output signals when an the H-level signal is inputted to all input terminals, and each of which outputs the L-level output signals in any other case.

The above describes the operation of the constituent components of the first twice-read logic circuit 48. An operation of the first twice-read logic circuit 48 will be described below with regard to the flow of signals.

First of all, at the timing of the leading edge of the system clock CLK2, the level of the first line current comparison signal HU inputted to an input terminal SI of the first twice-read logic circuit 48 is latched and held in the eighth D-latch 51 and is outputted at its output terminal Q. It is to be noted that the system clock CLK2 is in synchronization with the system clock CLK1, and has a frequency which is a plurality of times the frequency of the system clock CLK1.

Then, at the timing of the next leading edge of the system clock CLK2, the level at the output terminal Q of the eighth D-latch 51 is latched and held in the ninth D-latch 52 and is outputted at its output terminal Q. The level of the comparison signal HU at this timing is latched and held in the eighth D-latch 51 and is outputted at its output terminal Q.

Further, the output levels at the output terminals Q of the eighth and ninth D-latches 51 and 52 are transmitted to the fourth AND-circuit 55, and are transmitted to the third AND-circuit 54 via the twelfth and thirteenth inverter gates 137 and 138. Then, the output signal from the third AND-circuit 54 is transmitted to the input terminal R of the fourth RS flip-flop 53, while the output signal from the fourth AND-circuit 55 is transmitted to the input terminal S of the fourth RS flip-flop 53. Then, the output terminal Q of the fourth RS flip-flop 53 outputs the signal HU1 as an output signal of the first twice-read logic circuit 48.

As is apparent from above, it is understood that the first twice-read logic circuit 48 checks or detects the input signal HU at the timing of every leading edge of the system clock CLK2, then operates to switch the output signal HU1 to the H-level when two consecutive H-levels are detected, and operates to switch the output signal HU1 to the L-level when two consecutive L-levels are detected.

The above describes the internal operation of the first twice-read logic circuit 48, and the second and third twice-read logic circuits 49 and 50 operate in a manner similar to that of the first twice-read logic circuit 48.

Therefore, the first, second and third twice-read logic circuits 48, 49 and 50 can generate the comparison signals HU1, HV1 and HW1 freed from the signals attributed to very short-term noises included in the comparison signals HU, HV and HW, i.e., freed from the following signal change:

the H-level→the L-level→the H-level or the L-level→the H-level→the L-level.

It is to be noted that the number of times for reading the timing of the leading edge of the system clock CLK2 can be set to be equal to or greater than three by providing three or more D-latches and ANDing the output levels of the D-latches.

According to the third preferred embodiment of the present invention as described above, by providing the first, second and third twice-read logic circuits 48, 49 and 50 and transmitting the output comparison signals HU, HV and HW of the first, second and third comparators 17, 18 and 19 of the current controller 6 to the logic circuit 10a via the first, second and third twice-read logic circuits 48, 49 and 50, the noises superimposed on the output signals from the first, second and third comparators 17, 18 and 19 can be removed. Even under the condition that noises tend to take place, the line currents of the three-phase motor 1 can be controlled so that the line currents thereof correctly coincide with the first, second and third line current command signals iTU, iTV and iTW.

The first, second and third twice-read logic circuits 48, 49 and 50 may be incorporated into each of the first preferred embodiment and the second preferred embodiment. It is to be noted that the same effect can be of course obtained when the first, second and third twice-read logic circuits 48, 49 and 50 are incorporated into each of the first preferred embodiment and the second preferred embodiment.

Fourth Preferred Embodiment

A fourth preferred embodiment according to the present invention will be described with reference to the accompanying drawings.

Figure 9:
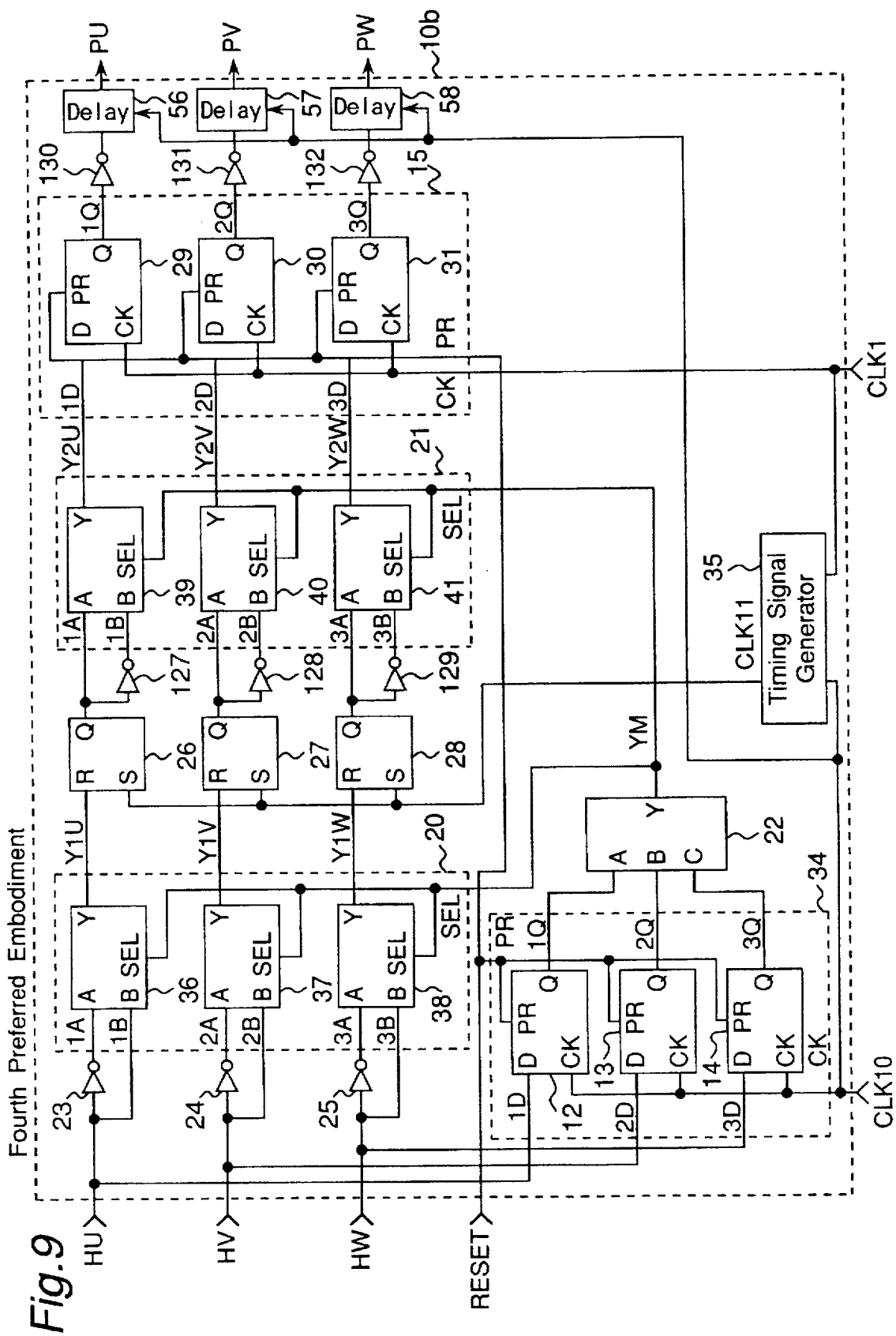
FIG. 9 is a block diagram of a logic circuit of a fourth preferred embodiment according to the present invention.
Figure 11:
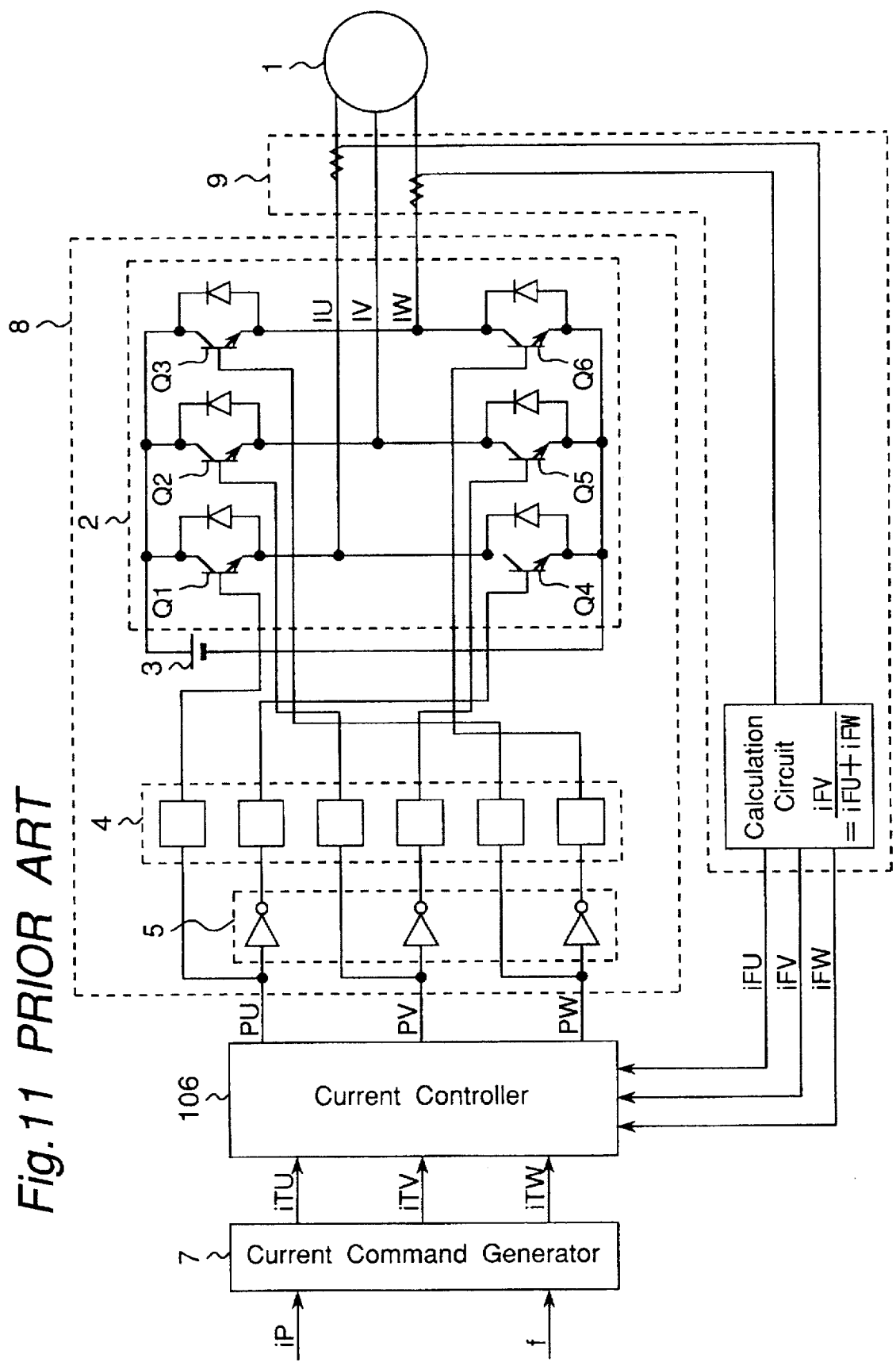
FIG. 11 is a block diagram of a generic prior art current command type PWM inverter system.
Figure 12:
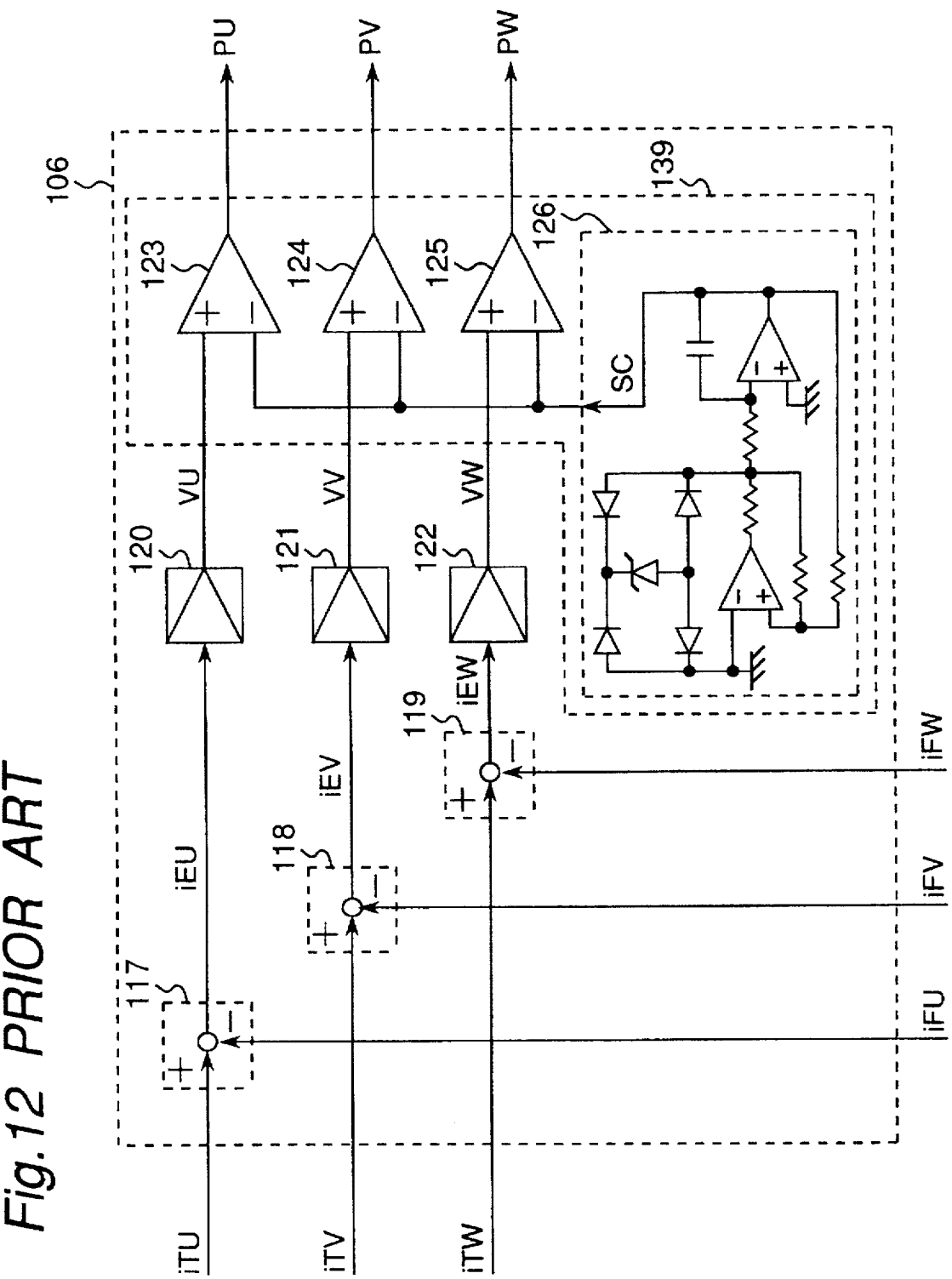
FIG. 12 is a block diagram of a prior art current controller shown in FIG. 1.
Figure 13A:
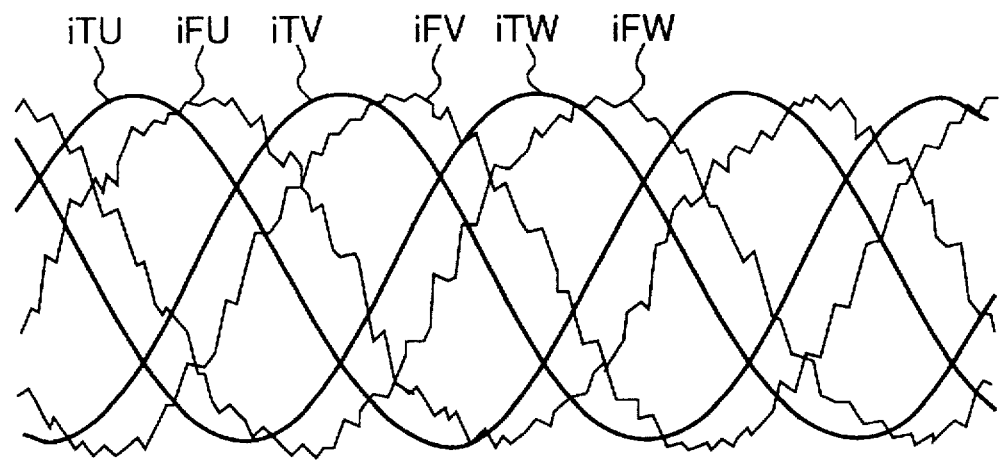
Figure 13B:
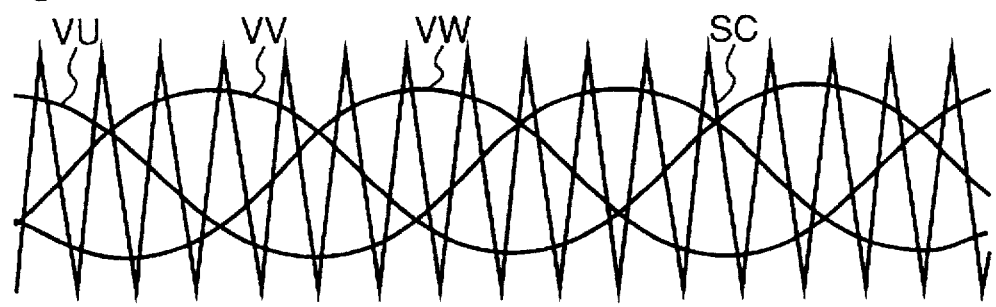
Figure 13C:
Figure 13D:
Figure 13E:
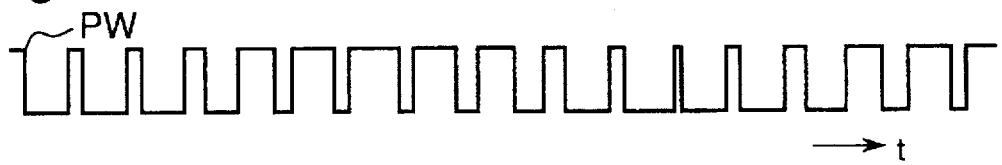
Figure 14:
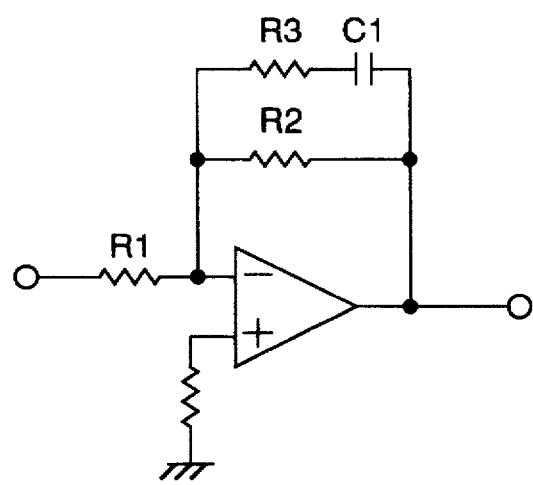
FIG. 14 is a circuit diagram of a prior art current error amplifier shown in FIG. 12.

FIG. 9 shows an internal structure of the logic circuit 10b of the current controller 6 of the current command type PWM inverter system shown in FIG. 7 according to the fourth preferred embodiment of the present invention.

Comparing the internal structure (FIG. 9) of the logic circuit 10b of the fourth preferred embodiment with the internal structure (FIG. 2) of the logic circuit 10 of the above-mentioned first preferred embodiment, the logic circuit 10b of the present preferred embodiment has quite the same structure except that the output signals PU1, PV1 and PW1 from the seventh, eighth and ninth inverter gates 130, 131 and 132 are inputted to first, second and third switching command signal delay circuits 56, 57 and 58, and the output signals from the delay circuits 56, 57 and 58 are transmitted as the first, second and third switching command signals PU, PV and PW to the main circuit power controller 8.

Explanation will be made here to the operations of the first, second and third switching command signal delay circuits 56, 57 and 58.

The first, second and third switching command signal delay circuits 56, 57 and 58 respectively receive the output signals PU1, PV1 and PW1 of the seventh, eighth and ninth inverter gates 130, 131 and 132, and transmit signals obtained by delaying the input signals by a predetermined timing according to a predetermined rule as the first, second and third switching command signals PU, PV and PW to the main circuit power controller 8. That is, in Table 1 and Table 3, the delay time is made to be zero only when the system state shifts to any one of the state Nos. A00, B00, C00, D00, E00, F00, G00 and H00, namely, at the leading edge of the system clock CLK10. When the system states shifts to any other state, the first, second and third switching command signals PU, PV and PW are outputted by being delayed by the predetermined time such as several micro seconds.

Control of the line currents of the three-phase motor 1 by the thus constructed current command type PWM inverter system of the fourth preferred embodiment according to the present invention will be described with reference to FIGS. 10A through 10C and Table 1.

Referring to FIGS. 10A through 10C, FIG. 10A is a timing chart of the first, second and third line current command signals iTU, iTV and iTW and the first, second and third detected line currents iFU, iFV and iFW. FIG. 10B is an enlarged timing chart showing an operation of the logic circuit 10b provided with the first, second and third switching command signal delay circuits 56, 57 and 58 in the region enclosed by dotted lines of FIG. 10A. FIG. 10C is a timing chart showing turning-on and turning-off operations of the main circuit switching power devices Q1, Q2, Q3, Q4, Q5 and Q6 based on the output levels of the S first, second and third switching command signals PU, PV and PW outputted from the first, second and third switching command signal delay circuits 56, 57 and 58.

First of all, explanation will be made to the operation at the timing t=t1, i.e., at the timing of the leading edge of the state updating timing signal CLK10 (in the case of the timing T3 in FIG. 4).

At the timing t=t1 when the signals iTU, iTV and iTW and iFU, iFV and iFW at the timing of the leading edge of the state updating timing signal CLK10 have the IB following magnitude relationships:

iTU>iFU, iTV<iFV, and iTW<iFW, then, the first, second and third line current comparison signals HU, HV and HW become the following states:

(HU, HV, HW)=(L, H, H).

The above-mentioned states correspond to the state No. A00 in the truth table of Table 1, and since (HU, HV, HW)=(L, H, H), the switching command signals PU1, PV1 and PW1 become the following states:

(PU1, PV1, PW1)=(H, L, L).

In the present case, the first, second and third switching command signal delay circuits 56, 57 and 58 output the switched signal levels of the signals PU1, PV1 and PW1 as PU, PV and PW without any level change, and the signals PU, PV and PW are transmitted to the main circuit power controller 8.

Then, the main circuit switching power devices Q1, Q2, Q3, Q4, Q5 and Q6 are respectively turned on, off, off, off, on and on, so that the first, second and third detected line currents iFU, iFV and iFW approach the first, second and third line current command signals iTU, iTV and iTW according to the electric time constant of the three-phase motor 1.

The above described the operation of the state shift to the state No. A00 at the timing of the leading edge of the state updating timing signal CLK10 at the timing t=t1.

Next, explanation will be made to the operation in the case where iTV>iFV and the system state shifts from (HU, HV, HW)=(L, H, H) to (HU, HV, HW)=(*, L, H)

at the timing (timing t=t11).

The logic circuit 10b receives these signals, and switches the signals PU1, PV1 and PW1 from (PU1, PV1, PW1)=(H, L, L) to (PU1, PV1, PW1)=(H, H, L).

The second switching command signal delay circuit 57 effects the switching of the L-level signal PV1 to the H-level from (PU, PV, PW)=(H, L, L) to (PU, PV, PW)=(H, H, L)

at the timing t=t111 after the elapse of a predetermined delay time TD, and turns the main circuit switching power devices Q2 and Q5 on and off, respectively.

Through the above-mentioned operation, the reduction of the second detected line current iFV is suppressed after the elapse of a predetermined time TD from the timing when the second detected line current iFV crosses the second line current command signal iTV, and then, the system state shifts to the state No. AX1.

As above is described the explanation of the operation at the timing t=t11.

Next, explanation will be made to the operation in the case where iTW>iFW and the system state shifts from (HU, HV, HW)=(*, L, H) to
(HU, HV, HW)=(*, L, L)

at the timing (timing t=t12).

The logic circuit 10b receives these input signals and switches the signals PU1, PV1 and PW1 from (PU1, PV1, PW1)=(H, H, L) to
(PU1, PV1, PW1)=(H, H, H).

The third switching command signal delay circuit 58 effects the switching of the L-level signal PW1 to the H-level from (PU, PV, PW)=(H, H, L) to
(PU, PV, PW)=(H, H, H)

at the timing t=t112 after the elapse of the predetermined delay time TD, and turns the main circuit switching power devices Q3 and Q6 on and off, respectively.

Through the above-mentioned operation, the reduction of the third detected line current iFW is suppressed after the elapse of a predetermined time TD from the timing when the third detected line current iFW crosses the third line current command signal iTW, and then, the system state shifts to the state No. AX2.

The above describes the operation at the timing t=t12.

Then, the state:

(PU, PV, PW)=(H, H, H)

is maintained until the timing of the next leading edge of the state updating timing signal CLK10.

By executing a similar operation after the timing of the next leading edge of the state updating timing signal CLK10, the line currents of the three-phase motor 1 are controlled so that the line currents thereof conform to the first, second and third line current command signals iTU, iTV and iTW.

The above describes the line current control of the three-phase motor 1 by means of the current command type PWM inverter system of the fourth preferred embodiment according to the present invention.

As described above, according to the fourth preferred embodiment of the present invention, the logic circuit 10b is provided with the first, second and third switching command signal delay circuits 56, 57 and 58, and the output signals from the seventh, eighth and ninth inverter gates 130, 131 and 132 are transmitted to the main circuit power controller 8 via the first, second and third switching command signal delay circuit 56, 57 and 58. With this arrangement, the first, second and third switching command signal delay circuits 56, 57 and 58 make the delay time zero only when the system state shifts to any one of the state Nos. A00, B00, C00, D00, E00, F00, G00 and H00 in Table 1 and Table 3, namely, at the leading edge of the system clock CLK10. When the system state shifts to any other state, the first, second and third switching command signals PU, PV and PW are transmitted to the main circuit power controller 8 by being delayed by the predetermined time by the first, second and third switching command signal delay circuit 56, 57 and 58.

With this arrangement, the line currents of the three-phase motor 1 can be made to very successfully coincide with the line current command signals.

It is to be noted that the present preferred embodiment is provided by incorporating the first, second and third switching command signal delay circuits 56, 57 and 58 into the first preferred embodiment. The first, second and third switching command signal delay circuits 56, 57 and 58 may be incorporated into the second preferred embodiment. The same effect can be of course obtained by incorporating the first, second and third switching command signal delay circuits 56, 57 and 58 into the second preferred embodiment.

The current command type PWM inverter system according to the present invention has a structure including no current error amplifier, and therefore, the problems of the gain adjustment of the current error amplifiers can be substantially solved, requiring no gain adjustment.

Furthermore, even when the characteristics and specifications of the motor, the motor current detector circuit, the current controller 6 and the main circuit power controller 8 change, the inverter system operates so that each line current error is consistently minimized. Furthermore, even when there are manufacturing-dependent variation of characteristics, temperature characteristics and the like, the inverter system operates so that each line current error is consistently minimized, thereby assuring a better current control responsibility and preventing the possible occurrence of an oscillation phenomenon.

Furthermore, the current controller 6 of the current command type PWM inverter system according to the present invention can be entirely implemented by simple digital circuits except for the first, second and third comparators 17, 18 and 19, so that the part constituted by the digital circuits are free from offset and drift and inexpensive.

Therefore, the present invention is free from the gain adjustment work and the offset adjustment work of the current error amplifiers while assuring a better current control responsibility and allowing an inexpensive current command type PWM inverter system to be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope according to the present invention as defined by the appended claims unless they depart therefrom.

What is claimed is:

1. A current command type PWM inverter apparatus comprising:

motor current detecting means for detecting line currents flowing from respective lines of said PWM inverter apparatus into a three-phase motor and outputting a first detected line current, a second detected line current and a third detected line current;

current command generating means for generating and outputting a first line current command signal, a second line current command signal and a third line current command signal for commanding the line currents to be sent from said respective lines into the three-phase motor;

first comparing means for comparing the first line current command signal with the first detected line current, outputting a first line current comparison signal having a first level when the first detected line current is equal to or greater than the first line current command signal, and outputting the first line current comparison signal having a second level when the first detected line current is smaller than the first line current command signal;

second comparing means for comparing the second line current command signal with the second detected line current, outputting a second line current comparison signal having a first level when the second detected line current is equal to or greater than the second line current command signal, and outputting the second line current comparison signal having a second level when the second detected line current is smaller than the second line current command signal;

third comparing means for comparing the third line current command signal with the third detected line current, outputting a third line current comparison signal having a first level when the third detected line current is equal to or greater than the third line current command signal, and outputting the third line current comparison signal having a second level when the third detected line current is smaller than the third line current command signal;

a main circuit DC power source;

a main circuit power device circuit having a three-phase bridge connection and comprising first, second, third, fourth, fifth and sixth main circuit switching power devices, and six reflux diodes respectively connected in parallel with said first, second, third, fourth, fifth and sixth main circuit switching power devices;

a logic circuit for receiving the first line current comparison signal, the second line current comparison signal and the third line current comparison signal, and generating and outputting first, second, third, fourth, fifth and sixth switching command signals for turning on or off said first, second, third, fourth, fifth and sixth main circuit switching power devices, to said first, second, third, fourth, fifth and sixth main circuit switching power devices, respectively; and timing generating means for generating and outputting a periodical state updating first timing to said logic circuit, wherein said first main circuit switching power device is connected to a positive electrode of said main circuit DC power source and supplies a first line current to said three-phase motor from said main circuit DC power source based on the first switching command signal, wherein said second main circuit switching power device is connected to the positive electrode of said main circuit DC power source and supplies a second line current to said three-phase motor from said main circuit DC power source based on the second switching command signal, wherein said third main circuit switching power device is connected to the positive electrode of said main circuit DC power source and supplies a third line current to said three-phase motor from said main circuit DC power source based on the third switching command signal, wherein said fourth main circuit switching power device is connected to a negative electrode of said main circuit DC power source and supplies the first line current to said three-phase motor from said main circuit DC power source based on the fourth switching command signal, wherein said fifth main circuit switching power device is connected to the negative electrode of said main circuit DC power source and supplies the second line current to said three-phase motor from said main circuit DC power source based on the fifth switching command signal, wherein said sixth main circuit switching power device is connected to the negative electrode of said main circuit DC power source and supplies the third line current to said three-phase motor from said main circuit DC power source based on the sixth switching command signal, wherein, at the state updating first timing, and at least one second timing when any one of the first, second and third comparison signals change after the state updating first timing, said logic circuit generates and outputs the first, second, third, fourth, fifth and sixth switching command signals.

2. The current command type PWM inverter apparatus as claimed in claim 1, wherein said logic circuit generates and outputs the first, second, third, fourth, fifth and sixth switching command signals so as to minimize an error between the first line current command signal and the first detected line current, an error between the second line current command signal and the second detected line current, and an error between the third line current command signal and the third detected line current.

3. The current command type PWM inverter apparatus as claimed in claim 2, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device.

4. The current command type PWM inverter apparatus as claimed in claim 2, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level before the third line current comparison signal changes from the first level to the second level, to a further timing when the third line current comparison signal changes from the first level to the second level, said logic circuit generates and outputs the fifth switching command signal for turning off the fifth main circuit switching power device and further generates and outputs the second switching command signal for turning on the second main circuit switching power device, and further, for a further time interval from the further timing when the third line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the third line current comparison signal changes from the first level to the second level before the second line current comparison signal changes from the first level to the second level, to a further timing when the second line current comparison signal changes from the first level to the second level, said logic circuit generates and outputs the sixth switching command signal for turning off the sixth main circuit switching power device and further generates and outputs the third switching command signal for turning on the third main circuit switching power device, and further, for a further time interval from the further timing when the second line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the third line current comparison signal changes from the first level to the second level before the first line current comparison signal changes from the first level to the second level, to a further timing when the first line current comparison signal changes from the first level to the second level, said logic circuit generates and outputs the sixth switching command signal for turning off the sixth main circuit switching power device and further generates and outputs the third switching command signal for turning on the third main circuit switching power device, and further, for a further time interval from the further timing when the first line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the first line current comparison signal changes from the first level to the second level before the third line current comparison signal changes from the first level to the second level, to a further timing when the third line current comparison signal changes from the first level to the second level, said logic circuit generates and outputs the fourth switching command signal for turning off the fourth main circuit switching power device and further generates and outputs the first switching command signal for turning on the first main circuit switching power device, and further, for a further time interval from the further timing when the third line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level before the second line current comparison signal changes from the first level to the second level, to a further timing when the second line current comparison signal changes from the first level to the second level, said logic circuit generates and outputs the fourth switching command signal for turning off the fourth main circuit switching power device and further generates and outputs the first switching command signal for turning on the first main circuit switching power device, and further, for a further time interval from the further timing when the second line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the second line current comparison signal changes from the first level to the second level before the first line current comparison signal changes from the first level to the second level, to a further timing when the first line current comparison signal changes from the first level to the second level, said logic circuit generates and outputs the fifth switching command signal for turning off the fifth main circuit switching power device and further generates and outputs the second switching command signal for turning on the second main circuit switching power device, and further, for a further time interval from the further timing when the first line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level before the third line current comparison signal changes from the second level to the first level, to a further timing when the third line current comparison signal changes from the second level to the first level, said logic circuit generates and outputs the second switching command signal for turning off the second main circuit switching power device and further generates and outputs the fifth switching command signal for turning on the fifth main circuit switching power device, and further, for a further time interval from the further timing when the third line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the third line current comparison signal changes from the second level to the first level before the second line current comparison signal changes from the second level to the first level, to a further timing when the second line current comparison signal changes from the second level to the first level, said logic circuit generates and outputs the third switching command signal for turning off the third main circuit switching power device and further generates and outputs the sixth switching command signal for turning on the sixth main circuit switching power device, and further, for a further time interval from the further timing when the second line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the third line current comparison signal changes from the second level to the first level before the first line current comparison signal changes from the second level to the first level, to a further timing when the first line current comparison signal changes from the second level to the first level, said logic circuit generates and outputs the third switching command signal for turning off the third main circuit switching power device and further generates and outputs the sixth switching command signal for turning on the sixth main circuit switching power device, and further, for a further time interval from the further timing when the first line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the first line current comparison signal changes from the second level to the first level before the third line current comparison signal changes from the second level to the first level, to a further timing when the third line current comparison signal changes from the second level to the first level, said logic circuit generates and outputs the first switching command signal for turning off the first main circuit switching power device and further generates and outputs the fourth switching command signal for turning on the fourth main circuit switching power device, and further, for a further time interval from the further timing when the third line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, for a time interval from a second timing when the second line current comparison signal changes from the second level to the first level before the first line current comparison signal changes from the second level to the first level, to a further timing when the first line current comparison signal changes from the second level to the first level, said logic circuit generates and outputs the second switching command signal for turning off the second main circuit switching power device and further generates and outputs the fifth switching command signal for turning on the fifth main circuit switching power device, and further, for a further time interval from the further timing when the first line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the first line current comparison signal changes from the second level to the first level before the second line current comparison signal changes from the second level to the first level, to a further timing when the second line current comparison signal changes from the second level to the first level, said logic circuit generates and outputs the first switching command signal for turning off the first main circuit switching power device and further generates and outputs the fourth switching command signal for turning on the fourth main circuit switching power device, and further, for a further time interval from the further timing when the second line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices.

5. The current command type PWM inverter apparatus as claimed in claim 3, wherein said first comparing means periodically compares the first line current command signal with the first detected line current, generates and outputs the first line current comparison signal having the first level when the first detected line current is equal to or greater than the first line current command signal at least two consecutive times, and generates and outputs the first line current comparison signal having the second level when the first detected line current is smaller than the first line current command signal at least two consecutive times, wherein said second comparing means periodically compares the second line current command signal with the second detected line current, generates and outputs the second line current comparison signal having the first level when the second detected line current is equal to or greater than the second line current command signal at least two consecutive times, and generates and outputs the second line current comparison signal having the second level when the second detected line current is smaller than the second line current command signal at least two consecutive times, wherein said third comparing means periodically compares the third line current command signal with the third detected line current, generates and outputs the third line current comparison signal having the first level when the third detected line current is equal to or greater than the third line current command signal at least two consecutive times, and generates and outputs the third line current comparison signal having the second level when the third detected line current is smaller than the third line current command signal at least two consecutive times.

6. The current command type PWM inverter apparatus as claimed in claim 4, wherein said first comparing means periodically compares the first line current command signal with the first detected line current, generates and outputs the first line current comparison signal having the first level when the first detected line current is equal to or greater than the first line current command signal at least two consecutive times, and generates and outputs the first line current comparison signal having the second level when the first detected line current is smaller than the first line current command signal at least two consecutive times, wherein said second comparing means periodically compares the second line current command signal with the second detected line current, generates and outputs the second line current comparison signal having the first level when the second detected line current is equal to or greater than the second line current command signal at least two consecutive times, and generates and outputs the second line current comparison signal having the second level when the second detected line current is smaller than the second line current command signal at least two consecutive times, wherein said third comparing means periodically compares the third line current command signal with the third detected line current, generates and outputs the third line current comparison signal having the first level when the third detected line current is equal to or greater than the third line current command signal at least two consecutive times, and generates and outputs the third line current comparison signal having the second level when the third detected line current is smaller than the third line current command signal at least two consecutive times.

7. The current command type PWM inverter apparatus as claimed in claim 3, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

8. The current command type PWM inverter apparatus as claimed in claim 4, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

9. The current command type PWM inverter apparatus as claimed in claim 5, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

10. The current command type PWM inverter apparatus as claimed in claim 6, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

11. A current command type PWM inverter apparatus comprising:

motor current detecting means for detecting line currents flowing from respective lines of said PWM inverter apparatus into a three-phase motor and outputting a first detected line current, a second detected line current and a third detected line current;

current command generating means for generating and outputting a first line current command signal, a second line current command signal and a third line current command signal for commanding the line currents to be sent from said respective lines into the three-phase motor;

first comparing means for comparing the first line current command signal with the first detected line current, outputting a first line current comparison signal having a first level when the first detected line current is greater than the first line current command signal, and outputting the first line current comparison signal having a second level when the first detected line current is equal to or smaller than the first line current command signal;

second comparing means for comparing the second line current command signal with the second detected line current, outputting a second line current comparison signal having a first level when the second detected line current is greater than the second line current command signal, and outputting the second line current comparison signal having a second level when the second detected line current is equal to or smaller than the second line current command signal;

third comparing means for comparing the third line current command signal with the third detected line current, outputting a third line current comparison signal having a first level when the third detected line current is greater than the third line current command signal, and outputting the third line current comparison signal having a second level when the third detected line current is equal to or smaller than the third line current command signal;

a main circuit DC power source;

a main circuit power device circuit having a three-phase bridge connection and comprising first, second, third, fourth, fifth and sixth main circuit switching power devices, and six reflux diodes respectively connected in parallel with said first, second, third, fourth, fifth and sixth main circuit switching power devices;

a logic circuit for receiving the first line current comparison signal, the second line current comparison signal and the third line current comparison signal, and generating and outputting first, second, third, fourth, fifth and sixth switching command signals for turning on or off said first, second, third, fourth, fifth and sixth main circuit switching power devices, to said first, second, third, fourth, fifth and sixth main circuit switching power devices, respectively; and timing generating means for generating and outputting a periodical state updating first timing to said logic circuit, wherein said first main circuit switching power device is connected to a positive electrode of said main circuit DC power source and supplies a first line current to said three-phase motor from said main circuit DC power source based on the first switching command signal, wherein said second main circuit switching power device is connected to the positive electrode of said main circuit DC power source and supplies a second line current to said three-phase motor from said main circuit DC power source based on the second switching command signal, wherein said third main circuit switching power device is connected to the positive electrode of said main circuit DC power source and supplies a third line current to said three-phase motor from said main circuit DC power source based on the third switching command signal, wherein said fourth main circuit switching power device is connected to a negative electrode of said main circuit DC power source and supplies the first line current to said three-phase motor from said main circuit DC power source based on the fourth switching command signal, wherein said fifth main circuit switching power device is connected to the negative electrode of said main circuit DC power source and supplies the second line current to said three-phase motor from said main circuit DC power source based on the fifth switching command signal, wherein said sixth main circuit switching power device is connected to the negative electrode of said main circuit DC power source and supplies the third line current to said three-phase motor from said main circuit DC power source based on the sixth switching command signal, wherein, at the state updating first timing, and at least one second timing when any one of the first, second and third comparison signals change after the state updating first timing, said logic circuit generates and outputs the first, second, third, fourth, fifth and sixth switching command signals.

12. The current command type PWM inverter apparatus as claimed in claim 11, wherein said logic circuit generates and outputs the first, second, third, fourth, fifth and sixth switching command signals so as to minimize an error between the first line current command signal and the first detected line current, an error between the second line current command signal and the second detected line current, and an error between the third line current command signal and the third detected line current.

13. The current command type PWM inverter apparatus as claimed in claim 12, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the third line current comparison signal changes from the first level to the second level to the next state updating first timing, said logic circuit generates and outputs the sixth switching command signal for turning off the sixth main circuit switching power device and further generates and outputs the third switching command signal for turning on the third main circuit switching power device, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level to the next state updating first timing, said logic circuit generates and outputs the fourth switching command signal for turning off the fourth main circuit switching power device and further generates and outputs the first switching command signal for turning on the first main circuit switching power device, and for a time interval from a second timing when the second line current comparison signal changes from the first level to the second level to the next state updating first timing, said logic circuit generates and outputs the fifth switching command signal for turning off the fifth main circuit switching power device and further generates and outputs the second switching command signal for turning on the second main circuit switching power device, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the third line current comparison signal changes from the second level to the first level to the next state updating first timing, said logic circuit generates and outputs the third switching command signal for turning off the third main circuit switching power device and further generates and outputs the sixth switching command signal for turning on the sixth main circuit switching power device, wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, for a time interval from a second timing when the first line current comparison signal changes from the second level to the first level to the next state updating first timing, said logic circuit generates and outputs the first switching command signal for turning off the first main circuit switching power device and further generates and outputs the fourth switching command signal for turning on the fourth main circuit switching power device, and for a time interval from a second timing when the second line current comparison signal changes from the second level to the first level to the next state updating first timing, said logic circuit generates and outputs the second switching command signal for turning off the second main circuit switching power device and further generates and outputs the fifth switching command signal for turning on the fifth main circuit switching power device.

14. The current command type PWM inverter apparatus as claimed in claim 12, wherein, when the first line current comparison signal has the second level, the second line current comparison signal has the first level and the third line current comparison signal has the first level at the state updating first timing, said logic circuit generates and outputs the second, third and fourth switching command signals for respectively turning off the second, third and fourth main circuit switching power devices, and further generates and outputs the first, fifth and sixth switching command signals for respectively turning on the first, fifth and sixth main circuit switching power devices, for a time interval from a second timing when the second line current comparison signal changes from the first level to the second level before the third line current comparison signal changes from the first level to the second level, to a further timing when the third line current comparison signal changes from the first level to the second level, said logic circuit generates and outputs the fifth switching command signal for turning off the fifth main circuit switching power device and further generates and outputs the second switching command signal for turning on the second main circuit switching power device, and further, for a further time interval from the further timing when the third line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the third line current comparison signal changes from the first level to the second level before the second line current comparison signal changes from the first level to the second level, to a further timing when the second line current comparison signal changes from the first level to the second level, said logic circuit generates and outputs the sixth switching command signal for turning off the sixth main circuit switching power device and further generates and outputs the third switching command signal for turning on the third main circuit switching power device, and further, for a further time interval from the further timing when the second line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the second level and the third line current comparison signal has the first level at the state updating first timing, said logic circuit generates and outputs the first, third and fifth switching command signals for respectively turning off the first, third and fifth main circuit switching power devices, and further generates and outputs the second, fourth and sixth switching command signals for respectively turning on the second, fourth and sixth main circuit switching power devices, for a time interval from a second timing when the third line current comparison signal changes from the first level to the second level before the first line current comparison signal changes from the first level to the second level, to a further timing when the first line current comparison signal changes from the first level to the second level, said logic circuit generates and outputs the sixth switching command signal for turning off the sixth main circuit switching power device and further generates and outputs the third switching command signal for turning on the third main circuit switching power device, and further, for a further time interval from the further timing when the first line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the first line current comparison signal changes from the first level to the second level before the third line current comparison signal changes from the first level to the second level, to a further timing when the third line current comparison signal changes from the first level to the second level, said logic circuit generates and outputs the fourth switching command signal for turning off the fourth main circuit switching power device and further generates and outputs the first switching command signal for turning on the first main circuit switching power device, and further, for a further time interval from the further timing when the third line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the first level and the third line current comparison signal has the second level at the state updating first timing, said logic circuit generates and outputs the first, second and sixth switching command signals for respectively turning off the first, second and sixth main circuit switching power devices, and further generates and outputs the third, fourth and fifth switching command signals for respectively turning on the third, fourth and fifth main circuit switching power devices, for a time interval from a second timing when the first line current comparison signal changes from the first level to the second level before the second line current comparison signal changes from the first level to the second level, to a further timing when the second line current comparison signal changes from the first level to the second level, said logic circuit generates and outputs the fourth switching command signal for turning off the fourth main circuit switching power device and further generates and outputs the first switching command signal for turning on the first main circuit switching power device, and further, for a further time interval from the further timing when the second line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, and for a time interval from a second timing when the second line current comparison signal changes from the first level to the second level before the first line current comparison signal changes from the first level to the second level, to a further timing when the first line current comparison signal changes from the first level to the second level, said logic circuit generates and outputs the fifth switching command signal for turning off the fifth main circuit switching power device and further generates and outputs the second switching command signal for turning on the second main circuit switching power device, and further, for a further time interval from the further timing when the first line current comparison signal changes from the first level to the second level, to the next state updating first timing, said logic circuit generates and outputs the first, second and third switching command signals for respectively turning off the first, second and third main circuit switching power devices and further generates and outputs the fourth, fifth and sixth switching command signals for respectively turning on the fourth, fifth and sixth main circuit switching power devices, wherein, when the first line current comparison signal has the first level, the second line current comparison signal has the second level and the third line current comparison signal has the second level at the state updating first timing, said logic circuit generates and outputs the first, fifth and sixth switching command signals for respectively turning off the first, fifth and sixth main circuit switching power devices, and further generates and outputs the second, third and fourth switching command signals for respectively turning on the second, third and fourth main circuit switching power devices, for a time interval from a second timing when the second line current comparison signal changes from the second level to the first level before the third line current comparison signal changes from the second level to the first level, to a further timing when the third line current comparison signal changes from the second level to the first level, said logic circuit generates and outputs the second switching command signal for turning off the second main circuit switching power device and further generates and outputs the fifth switching command signal for turning on the fifth main circuit switching power device, and further, for a further time interval from the further timing when the third line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the third line current comparison signal changes from the second level to the first level before the second line current comparison signal changes from the second level to the first level, to a further timing when the second line current comparison signal changes from the second level to the first level, said logic circuit generates and outputs the third switching command signal for turning off the third main circuit switching power device and further generates and outputs the sixth switching command signal for turning on the sixth main circuit switching power device, and further, for a further time interval from the further timing when the second line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, wherein, when the first line current comparison signal has the second level, the second line current comparison signal has the first level and the third line current comparison signal has the second level at the state updating first timing, said logic circuit generates and outputs the second, fourth and sixth switching command signals for respectively turning off the second, fourth and sixth main circuit switching power devices, and further generates and outputs the first, third and fifth switching command signals for respectively turning on the first, third and fifth main circuit switching power devices, for a time interval from a second timing when the third line current comparison signal changes from the second level to the first level before the first line current comparison signal changes from the second level to the first level, to a further timing when the first line current comparison signal changes from the second level to the first level, said logic circuit generates and outputs the third switching command signal for turning off the third main circuit switching power device and further generates and outputs the sixth switching command signal for turning on the sixth main circuit switching power device, and further, for a further time interval from the further timing when the first line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the first line current comparison signal changes from the second level to the first level before the third line current comparison signal changes from the second level to the first level, to a further timing when the third line current comparison signal changes from the second level to the first level, said logic circuit generates and outputs the first switching command signal for turning off the first main circuit switching power device and further generates and outputs the fourth switching command signal for turning on the fourth main circuit switching power device, and further, for a further time interval from the further timing when the third line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, wherein, when the first line current comparison signal has the second level, the second line current comparison signal has the second level and the third line current comparison signal has the first level at the state updating first timing, said logic circuit generates and outputs the third, fourth and fifth switching command signals for respectively turning off the third, fourth and fifth main circuit switching power devices, and further generates and outputs the first, second and sixth switching command signals for respectively turning on the first, second and sixth main circuit switching power devices, for a time interval from a second timing when the second line current comparison signal changes from the second level to the first level before the first line current comparison signal changes from the second level to the first level, to a further timing when the first line current comparison signal changes from the second level to the first level, said logic circuit generates and outputs the second switching command signal for turning off the second main circuit switching power device and further generates and outputs the fifth switching command signal for turning on the fifth main circuit switching power device, and further, for a further time interval from the further timing when the first line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices, and for a time interval from a second timing when the first line current comparison signal changes from the second level to the first level before the second line current comparison signal changes from the second level to the first level, to a further timing when the second line current comparison signal changes from the second level to the first level, said logic circuit generates and outputs the first switching command signal for turning off the first main circuit switching power device and further generates and outputs the fourth switching command signal for turning on the fourth main circuit switching power device, and further, for a further time interval from the further timing when the second line current comparison signal changes from the second level to the first level, to the next state updating first timing, said logic circuit generates and outputs the fourth, fifth and sixth switching command signals for respectively turning off the fourth, fifth and sixth main circuit switching power devices and further generates and outputs the first, second and third switching command signals for respectively turning on the first, second and third main circuit switching power devices.

15. The current command type PWM inverter apparatus as claimed in claim 13, wherein said first comparing means periodically compares the first line current command signal with the first detected line current, generates and outputs the first line current comparison signal having the first level when the first detected line current is greater than the first line current command signal at least two consecutive times, and generates and outputs the first line current comparison signal having the second level when the first detected line current is equal to or smaller than the first line current command signal at least two consecutive times, wherein said second comparing means periodically compares the second line current command signal with the second detected line current, generates and outputs the second line current comparison signal having the first level when the second detected line current is greater than the second line current command signal at least two consecutive times, and generates and outputs the second line current comparison signal having the second level when the second detected line current is equal to or smaller than the second line current command signal at least two consecutive times, wherein said third comparing means periodically compares the third line current command signal with the third detected line current, generates and outputs the third line current comparison signal having the first level when the third detected line current is greater than the third line current command signal at least two consecutive times, and generates and outputs the third line current comparison signal having the second level when the third detected line current is equal to or smaller than the third line current command signal at least two consecutive times.

16. The current command type PWM inverter apparatus as claimed in claim 14, wherein said first comparing means periodically compares the first line current command signal with the first detected line current, generates and outputs the first line current comparison signal having the first level when the first detected line current is greater than the first line current command signal at least two consecutive times, and generates and outputs the first line current comparison signal having the second level when the first detected line current is equal to or smaller than the first line current command signal at least two consecutive times, wherein said second comparing means periodically compares the second line current command signal with the second detected line current, generates and outputs the second line current comparison signal having the first level when the second detected line current is greater than the second line current command signal at least two consecutive times, and generates and outputs the second line current comparison signal having the second level when the second detected line current is equal to or smaller than the second line current command signal at least two consecutive times, wherein said third comparing means periodically compares the third line current command signal with the third detected line current, generates and outputs the third line current comparison signal having the first level when the third detected line current is greater than the third line current command signal at least two consecutive times, and generates and outputs the third line current comparison signal having the second level when the third detected line current is equal to or smaller than the third line current command signal at least two consecutive times.

17. The current command type PWM inverter apparatus as claimed in claim 13, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

18. The current command type PWM inverter apparatus as claimed in claim 14, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

19. The current command type PWM inverter apparatus as claimed in claim 15, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

20. The current command type PWM inverter apparatus as claimed in claim 16, further comprising:

delaying means for, at a timing when any one of the first, second and third line current comparison signals changes, respectively delaying the first, second, third, fourth, fifth and sixth switching command signals outputted from said logic circuit, by a predetermined delay time, and outputting a delayed first, second, third, fourth, fifth and sixth switching command signals to said first, second, third, fourth, fifth and sixth main circuit switching power devices.

* * * * *